United States Patent
Okabe et al.

(10) Patent No.: US 9,056,440 B2
(45) Date of Patent: Jun. 16, 2015

(54) HOLDING SEAL MATERIAL, EXHAUST GAS PURIFYING APPARATUS AND METHOD OF MANUFACTURING HOLDING SEAL MATERIAL

(71) Applicant: IBIDEN CO., LTD., Ogaki-shi, Gifu (JP)

(72) Inventors: Takahiko Okabe, Takahama (JP); Keiji Kumano, Takahama (JP)

(73) Assignee: IBIDEN CO., LTD., Ogaki-shi (JP)

( * ) Notice: Subject to any disclaimer, the term of this patent is extended or adjusted under 35 U.S.C. 154(b) by 95 days.

(21) Appl. No.: 13/803,809

(22) Filed: Mar. 14, 2013

(65) Prior Publication Data
US 2013/0255209 A1 Oct. 3, 2013

(30) Foreign Application Priority Data
Mar. 27, 2012 (JP) ................. 2012-072387

(51) Int. Cl.
| | | |
|---|---|---|
| B01D 50/00 | (2006.01) | |
| B01D 24/00 | (2006.01) | |
| B01D 39/20 | (2006.01) | |
| B01D 39/14 | (2006.01) | |
| B01D 39/06 | (2006.01) | |
| B32B 5/28 | (2006.01) | |
| B01D 46/00 | (2006.01) | |
| B32B 5/26 | (2006.01) | |

(52) U.S. Cl.
CPC ............ *B32B 5/28* (2013.01); *B01D 46/0005* (2013.01); *Y10T 428/24322* (2015.01); *Y10T 156/10* (2015.01); *Y10T 428/2495* (2015.01); *B32B 5/26* (2013.01); *B32B 2260/023* (2013.01); *B32B 2262/10* (2013.01); *B32B 2264/10* (2013.01); *B32B 2597/00* (2013.01); *B32B 2605/00* (2013.01)

(58) Field of Classification Search
CPC ... F01N 3/2864; F01N 3/2853; F01N 3/2839; B01D 46/005; C04B 30/02; C04B 20/00; C04B 20/0048
USPC ............. 55/522–524; 422/169–172, 177–182
See application file for complete search history.

(56) References Cited

U.S. PATENT DOCUMENTS

| | | | | |
|---|---|---|---|---|
| 6,022,621 | A * | 2/2000 | McCarron et al. | 428/379 |
| 2002/0127154 | A1 | 9/2002 | Foster et al. | |
| 2011/0311404 | A1 * | 12/2011 | Creedon et al. | 422/177 |
| 2012/0100046 | A1 * | 4/2012 | Kelsall et al. | 422/311 |

FOREIGN PATENT DOCUMENTS

| | | |
|---|---|---|
| CN | 1437677 | 8/2003 |
| CN | 1749536 | 3/2006 |
| CN | 101283167 | 10/2008 |
| JP | 2002-206421 | 7/2002 |

\* cited by examiner

*Primary Examiner* — Amber Orlando
(74) *Attorney, Agent, or Firm* — Mori & Ward, LLP

(57) ABSTRACT

A holding seal material includes inorganic fibers, skin layers provided around the inorganic fibers, inorganic particles included in the skin layers, a first main surface, and a second main surface. Thicknesses of the skin layers satisfy $X > Y \geq Z$. X is a thickness of the skin layer of the inorganic fibers in a vicinity of the first main surface. Y is a thickness of the skin layer of the inorganic fibers in a vicinity of a center of the holding seal material in a thickness direction. Z is a thickness of the skin layer of the inorganic fibers in a vicinity of the second main surface.

5 Claims, 11 Drawing Sheets

HOLDING SEAL MATERIAL, EXHAUST GAS PURIFYING APPARATUS AND METHOD OF MANUFACTURING HOLDING SEAL MATERIAL

CROSS-REFERENCE TO RELATED APPLICATIONS

The present application claims priority under 35 U.S.C. §119 to Japanese Patent Application No. 2012-072387, filed Mar. 27, 2012. The contents of this application are incorporated herein by reference in their entirety.

BACKGROUND OF THE INVENTION

1. Field of the Invention

The present invention relates to a holding seal material, an exhaust gas purifying apparatus, and a method of manufacturing a holding seal material.

2. Discussion of the Background

In exhaust gas exhausted from an internal combustion engine, such as a diesel engine, particulate matter (hereinafter also referred to as PM) is included, and, in recent years, the harmful influence of PM on the environment or human bodies has become a problem. In addition, since harmful gas components, such as CO, HC and $NO_x$, are included in exhaust gas, there is a concern as well regarding the influence of the harmful gas components on the environment or human bodies.

Therefore, as an exhaust gas purifying apparatus that collects PM in exhaust gas or purifies the harmful gas components, a variety of exhaust gas purifying apparatuses configured of an exhaust gas treatment body made of a porous ceramic, such as silicon carbide or cordierite, a casing that accommodates the exhaust gas treatment body, and a holding seal material disposed between the exhaust gas treatment body and the casing are proposed. The holding seal material is disposed mainly for preventing the exhaust gas treatment body from coming into contact with the casing that covers the outer circumference of the exhaust gas treatment body and being broken, which may be caused by vibrations or impacts generated due to the traveling and the like of an automobile, or for preventing the leakage of exhaust gas between the exhaust gas treatment body and the casing.

Here, for internal combustion engines, there is a tendency to increase the temperature and pressure of exhaust gas in order to run internal combustion engines under conditions close to the theoretical air fuel ratio for the purpose of improving the gas mileage. When high-temperature and high-pressure exhaust gas reaches the exhaust gas purifying apparatus, since there are cases in which the gap between the exhaust gas treatment body and the casing varies due to the difference in thermal expansion coefficient between the exhaust gas treatment body and the casing, there is a demand for the holding seal material to have a holding force for the exhaust gas treatment body, which does not change due to a certain degree of variation of the gap.

In order to improve the holding performance of the holding seal material, JP-A-2002-206421 describes the attachment of inorganic particles to the surfaces of inorganic fibers.

SUMMARY OF THE INVENTION

According to one aspect of the present invention, a holding seal material includes inorganic fibers, skin layers provided around the inorganic fibers, inorganic particles included in the skin layers, a first main surface, and a second main surface. Thicknesses of the skin layers satisfy a following relational expression (1).

$$X > Y \geq Z \tag{1}$$

X is a thickness of the skin layer of the inorganic fibers in a vicinity of the first main surface. Y is a thickness of the skin layer of the inorganic fibers in a vicinity of a center of the holding seal material in a thickness direction. Z is a thickness of the skin layer of the inorganic fibers in a vicinity of the second main surface.

According to another aspect of the present invention, an exhaust gas purifying apparatus includes an exhaust gas treatment body, a metal casing that accommodates the exhaust gas treatment body, and the holding seal material. The holding seal material is disposed between the exhaust gas treatment body and the metal casing, and holds the exhaust gas treatment body.

According to further aspect of the present invention, a method of manufacturing a holding seal material includes preparing a mat which is made of inorganic fibers and has a first main surface and a second main surface. An inorganic binder including inorganic particles and water is brought into contact with the mat. Hot air is blown so as to hit the second main surface of the mat, thereby ventilating the hot air into the mat and drying the mat.

According to further aspect of the present invention, a method of manufacturing a holding seal material includes preparing a first mat which includes first inorganic fibers, first skin layers provided around the first inorganic fibers, and inorganic particles included in the skin layers. A second mat which includes second inorganic fibers, and second skin layers provided around the second inorganic fibers, and being thinner than the first skin layers, or which includes the second inorganic fibers and does not include the second skin layers is prepared. The first mat and the second mat are laminated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
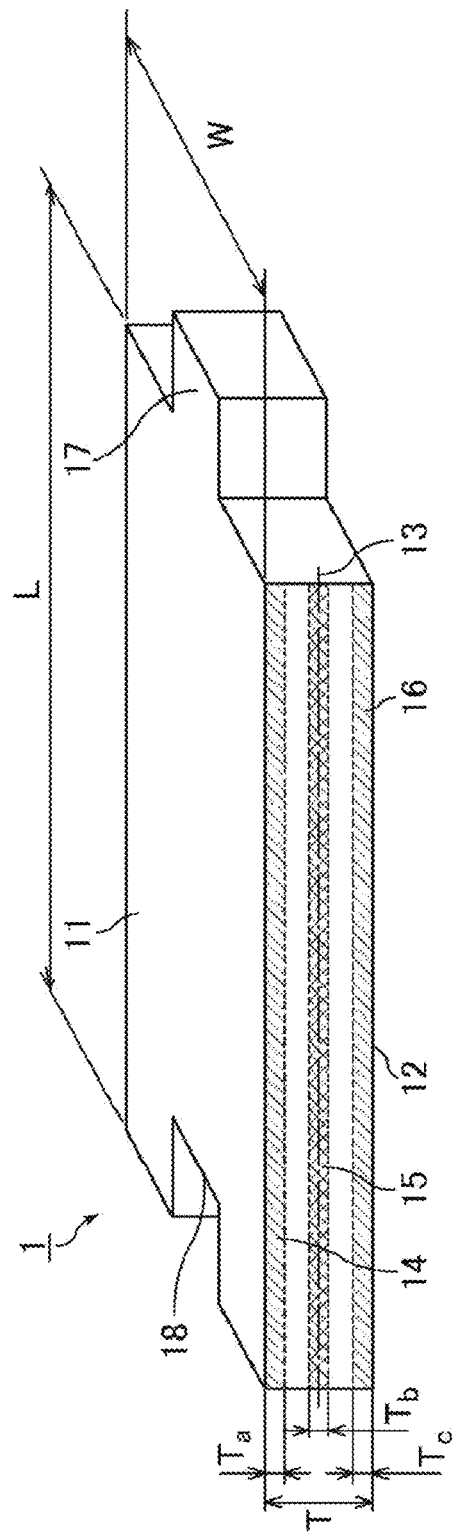
FIG. 1 is a perspective view schematically illustrating a holding seal material according to a first embodiment of the invention.

A holding seal material according to an embodiment is a holding seal material which includes inorganic fibers and inorganic particles, and has a first main surface and a second main surface, in which the inorganic fibers are coated with skin layers including the inorganic particles, and the thicknesses of the skin layers satisfy the following relational expression (1), when the thickness of the skin layer of the inorganic fibers in the vicinity of the first main surface is X, the thickness of the skin layer of the inorganic fibers in the vicinity of the center of the holding seal material in the thickness direction is Y, and the thickness of the skin layer of the inorganic fibers in the vicinity of the second main surface is Z, $$X > Y \geq Z \qquad (1).$$

In the holding seal material, the inorganic fibers are coated with the skin layers including the inorganic particles, and the thickness of the skin layer of the inorganic fibers becomes thick in the vicinity of the first main surface.

In the vicinity of the first main surface having a thick thickness of the skin layer, since the attached amount of the inorganic particles is large, recesses and protrusions on the surface of the inorganic fibers become large, the friction between the inorganic fibers increases, and the contact pressure becomes extremely large.

In addition, in the vicinity of the center of the holding seal material in the thickness direction and in the vicinity of the second main surface, the thicknesses of the skin layers become thinner than the thickness of the skin layer in the vicinity of the first main surface.

When the thickness of the skin layer is thin, since the attached amount of the inorganic particles is small, the holding seal material becomes easy to bend.

This is because the number of contact points, at which the inorganic fibers join together, decreases, and the inorganic fibers become easy to move.

In addition, even in the vicinity of the center of the holding seal material in the thickness direction and in the vicinity of the second main surface, the effect of improving the contact pressure can be obtained through the attachment of the inorganic particles.

As such, when the thicknesses of the skin layers of the inorganic fibers change in the thickness direction of the holding seal material, it is possible to produce a holding seal material which has an effect of improving the contact pressure, and is easy to bend.

Meanwhile, the "vicinity of the first main surface" refers to an area formed by cutting an area 1 mm thick from one main surface of the main surfaces of the holding seal material in the thickness direction.

In addition, the "vicinity of the center in the thickness direction" refers to an area formed by setting the line that cuts the middle of the thickness of the holding seal material as the "center line in the thickness direction" and cutting areas 0.5 mm wide above and below the center line, that is, an area of a total of 1 mm wide.

In addition, the "vicinity of the second main surface" refers to an area formed by cutting an area 1 mm thick from the opposite main surface to the first main surface among the main surfaces of the holding seal material in the thickness direction.

The details of the areas will be described using the drawings.

In addition, the thicknesses of the skin layers of the inorganic fibers are measured by photographing the cross sections of the inorganic fibers present in the above three areas using a transmission electron microscope (TEM).

Five inorganic fibers present in the above three areas are removed, the thicknesses of the skin layers are measured, and the average values are calculated, thereby calculating the thicknesses of the skin layers of the inorganic fibers in the respective areas.

The details of the method of measuring the thickness of the skin layer will be described using the drawings.

A holding seal material according to an embodiment includes a glass fiber and an alumina fiber as the inorganic fibers, in which a larger number of the glass fibers are present in the vicinity of the first main surface than in the vicinity of the second main surface by weight ratio.

The glass fiber is excellent in terms of elasticity, but is inferior to the alumina fiber in terms of heat resistance. Therefore, it is desirable to dispose a large number of the alumina fibers that are highly heat-resistant on the exhaust gas treatment body side, which is exposed to a higher temperature, and to dispose a large number of the glass fibers that are excellent in terms of elasticity on the casing side, which requires higher elasticity.

Based on the above assumption, a larger number of the glass fibers are made to be present in the vicinity of the first main surface, in which the thickness of the skin layer is thick. In addition, a larger number of the alumina fibers are made to be present in the vicinity of the second main surface, in which the thickness of the skin layer is thin.

When the holding seal material having the above configuration is wound around the exhaust gas treatment body with the first main surface disposed on the casing side and the second main surface disposed on the exhaust gas treatment body, and is accommodated in the casing, thereby making an exhaust gas purifying apparatus, the exhaust gas purifying apparatus has a high holding force on the casing side, is excellently heat-resistant and easy to bend on the exhaust gas treatment body side.

A holding seal material according to an embodiment further includes an organic binder.

When the organic binder is attached to the inorganic fibers, it is possible to make the interrelated structure of the inorganic fibers stronger, and to suppress an increase in the bulk of the holding seal material.

A holding seal material according to an embodiment is a holding seal material obtained from a mat made of inorganic fibers on which a needle punching treatment has been carried out.

When the needle punching treatment is carried out, it is possible to make the fibers be interrelated so as to appropriately reduce the bulk of the holding seal material so that work efficiency can be increased during canning, and the contact pressure of the holding seal material can be increased using the entanglement of the inorganic fibers.

An exhaust gas purifying apparatus according to an embodiment has an exhaust gas treatment body, a metal casing that accommodates the exhaust gas treatment body, and a holding seal material which is disposed between the exhaust gas treatment body and the metal casing, and holds the exhaust gas treatment body, in which the holding seal material is the holding seal material of the embodiment of the invention.

When the holding seal material of the embodiment of the invention is used as the holding seal material, it is possible to make an exhaust gas purifying apparatus in which the holding seal material is wound around the exhaust gas treatment body in a state of having no winding wrinkles which are generated on the inner circumference side (the exhaust gas treatment body side) of the holding seal material or cracking which occurs on the outer circumference side (the casing side) of the holding seal material, and the exhaust gas treatment body is held with a high holding force.

A method of manufacturing a holding seal material according to an embodiment includes a mat preparation process of preparing a mat which is made of inorganic fibers and has a first main surface and a second main surface, a process of bringing an inorganic binder including inorganic particles and water into contact with the mat, and a drying process of drying the mat, in which, in the drying process, hot air is blown so as to hit the second main surface of the mat, thereby ventilating the hot air into the mat.

When the method of blowing the hot air in the drying process is specified, it is possible to bias the distribution of the inorganic particles. As a result, many inorganic particles are attached to the first main surface of the mat, and it is possible to manufacture a holding seal material having a thick thickness of the skin layer of the inorganic fibers in the vicinity of the first main surface.

In a method of manufacturing a holding seal material according to an embodiment, the inorganic particles are alumina particles, and the shape of the secondary particles of the alumina particles in the inorganic binder is a chain shape.

When chain-shaped alumina particles are used, since the entanglement of the secondary particles is large, and the secondary particles are attached to the surface of the inorganic fibers while the particles join to each other, it is possible to increase the uniformity in the thickness of the skin layer. Therefore, the characteristics of the holding seal material are stably exhibited.

A method of manufacturing a holding seal material according to an embodiment includes a first mat preparation process of preparing a first mat which includes inorganic fibers and inorganic particles, and is formed by coating skin layers including the inorganic particles around the inorganic fibers, a second mat preparation process of preparing a second mat which includes inorganic fibers and is formed by coating skin layers, which are thinner than the skin layers in the first mat, around the inorganic fibers or a second mat having no skin layer coated around the inorganic fibers, and a process of laminating the first mat and the second mat.

When a plurality of mats with the skin layers of the inorganic fibers having different thicknesses are laminated, it is possible to manufacture a holding seal material in which the thicknesses of the skin layers of the inorganic fibers in the vicinity of the first main surface are thick, and the thicknesses of the skin layers of the inorganic fibers in the vicinity of the second main surface are thin.

The embodiments will now be described with reference to the accompanying drawings, wherein like reference numerals designate corresponding or identical elements throughout the various drawings.

(First Embodiment)

Hereinafter, a first embodiment, which is an embodiment of the holding seal material, the method of manufacturing a holding seal material and the exhaust gas purifying apparatus of the invention, will be described.

FIG. 1 is a perspective view schematically illustrating a holding seal material according to a first embodiment of the invention.

A holding seal material 1 of the present embodiment is a mat that is substantially rectangular in a planar view, having a predetermined length in the longitudinal direction (hereinafter indicated by the arrow L in FIG. 1), a width (indicated by the arrow W in FIG. 1) and a thickness (indicated by the arrow T in FIG. 1). In addition, the holding seal material 1 has a first main surface 11 and a second main surface 12, which is a main surface on the opposite side of the first main surface 11.

In the holding seal material 1 illustrated in FIG. 1, of the edge portions of the holding seal material 1 in the longitudinal direction, a protrusion portion 17 is formed on an edge portion, and a recess portion 18 is formed on the other edge portion. The protrusion portion 17 and the recess portion 18 of the holding seal material 1 form shapes that are perfectly engaged with each other when the holding seal material 1 is wound around an exhaust gas treatment body in order to assemble an exhaust gas purifying apparatus described below.

The holding seal material 1 has a predetermined thickness T.

The orientation of the thickness T of the holding seal material is in a perpendicular direction to the first main surface 11 and the second main surface 12.

The holding seal material of the embodiment has three areas of a "vicinity of the first main surface", a "vicinity of the center in the thickness direction" and a "vicinity of the second main surface", which are areas formed by cutting the holding seal material so as to obtain predetermined thicknesses.

The "vicinity of the first main surface" refers to an area formed by cutting an area 1 mm thick from the first main surface 11 (an area indicated by 14 in FIG. 1) in the thickness direction. Ta in FIG. 1 indicates the thickness in the vicinity of the first main surface, and Ta is 1 mm.

The "vicinity of the center in the thickness direction" refers to an area formed by setting the line that cuts the middle of the thickness of the holding seal material as the "center line in the thickness direction (the line indicated by 13 in FIG. 1)" and cutting areas 0.5 mm wide above and below the center line, that is, an area of a total of 1 mm wide (an area indicated by 15 in FIG. 1). Tb in FIG. 1 indicates the thickness in the vicinity of the center in the thickness direction, and Tb is 1 mm.

The "vicinity of the second main surface" refers to an area formed by cutting an area 1 mm thick from the second main surface 12 (an area indicated by 16 in FIG. 1) in the thickness direction. Tc in FIG. 1 indicates the thickness in the vicinity of the second main surface, and Tc is 1 mm.

The holding seal material 1 of the embodiment includes an inorganic fiber and inorganic particles. The inorganic fiber is coated with a skin layer including the inorganic particles.

The inorganic fiber is not particularly limited, and is desirably at least an inorganic fiber selected from a group consisting of an alumina fiber, an alumina silica fiber, a silica fiber, a bio-soluble fiber and a glass fiber. The inorganic fiber may be changed depending on the characteristics and the like required for the holding seal material, such as heat resistance, wind resistance and the like.

Among the above, an inorganic fiber made of alumina with a low crystallinity is desirable, and an inorganic fiber made of alumina with a low crystallinity having a mullite composition is more desirable.

The inorganic particles are desirably alumina or silica particles. Alumina is attached to the inorganic fiber in a form of an alumina sol, that is, as an inorganic binder. Meanwhile, the inorganic binder is an aqueous solution including inorganic particles.

In addition, each of the inorganic particles is heated so as to become alumina, thereby strongly adhering the inorganic fibers. Meanwhile, in a case in which a silica sol is used, a cation-based silica sol is preferably used.

In addition, in a case in which the inorganic particles are alumina particles, it is desirable to use particles in which the shapes of the secondary particles in the aqueous solution (in the inorganic binder) are chain shapes as the alumina particles.

The alumina particles having a shape of a chain shape refers to alumina particles in which plate-like alumina primary particles are linked in a state of being dispersed in water, and, furthermore, are linked in steric branches so as to form agglomerated secondary particles (several hundreds of nanometers).

When the chain-shaped alumina particles are used, since the entanglement of secondary particles is large, and the particles are attached to the surface of the inorganic fibers while the particles join to each other, thereby increasing the uniformity in the thickness of the skin layer, the characteristics of the holding seal material are stably exhibited.

Furthermore, in a case in which the zeta potential of the alumina particles dispersed in the aqueous solution has positive charge, and an alumina fiber or a glass fiber having negative charges is used as the inorganic fiber, the alumina particles are strongly attached to the surface of the inorganic fiber. Similarly to a papermaking method in which inorganic particles are uniformly attached to the surface of an inorganic fiber while being stirred in a slurry, inorganic particles are uniformly attached to the surface of an inorganic fiber even in an impregnating method in which an inorganic binder having a small amount of inorganic particles with a low concentration dispersed therein is impregnated in a mat.

In addition, fibrous alumina secondary particles, alumina secondary particles in a linear state having a columnar aspect ratio, or alumina secondary particles agglomerated in a feathered shape are also preferable.

In the holding seal material 1 of the embodiment, the thicknesses of the skin layers of the inorganic fibers in the vicinity of the first main surface 14, the vicinity of the center in the thickness direction 15 and the vicinity of the second main surface 16 are different.

Hereinafter, the above fact will be described in detail using the drawings.

Figure 2A:
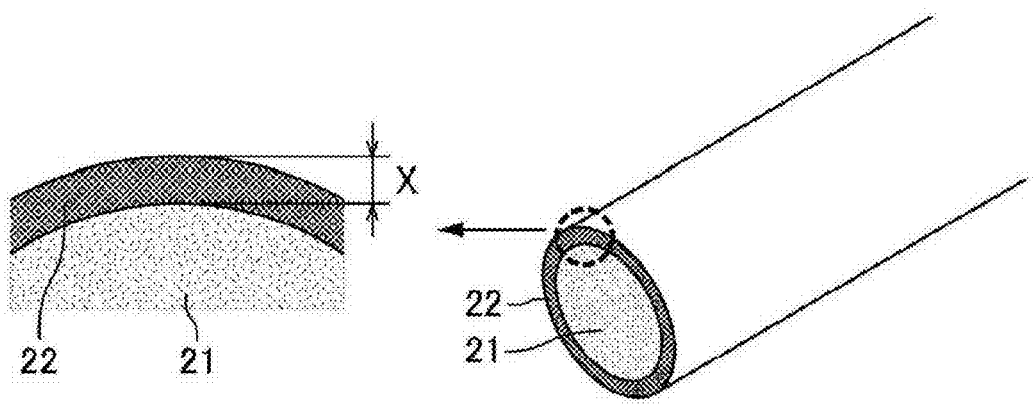
FIG. 2A shows a perspective view of an inorganic fiber present in the vicinity of a first main surface of the holding seal material and a cross-sectional view schematically illustrating an enlarged part of a cross-section of the inorganic fiber.
Figure 2B:
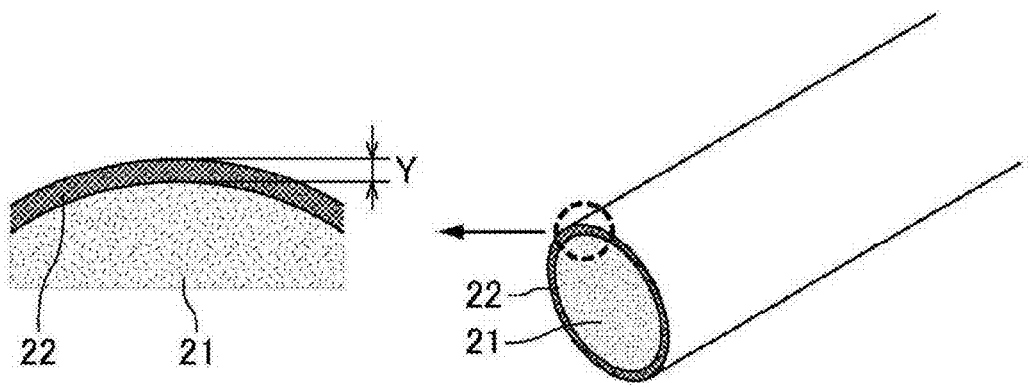
FIG. 2B shows a perspective view of an inorganic fiber present in the vicinity of the center of the holding seal material in the thickness direction and a cross-sectional view schematically illustrating an enlarged part of a cross-section of the inorganic fiber.
Figure 2C:
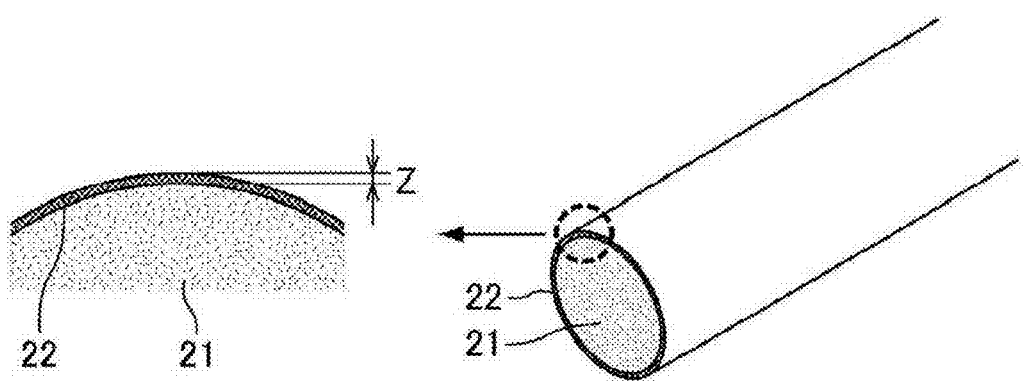
FIG. 2C shows a perspective view of an inorganic fiber present in the vicinity of a second main surface of the holding seal material and a cross-sectional view schematically illustrating an enlarged part of a cross-section of the inorganic fiber.

FIG. 2A shows a perspective view of the inorganic fiber present in the vicinity of the first main surface of the holding seal material and a cross-sectional view schematically illustrating an enlarged part of a cross-section of the inorganic fiber. FIG. 2B shows a perspective view of the inorganic fiber present in the vicinity of the center of the holding seal material in the thickness direction and a cross-sectional view schematically illustrating an enlarged part of a cross-section of the inorganic fiber. FIG. 2C shows a perspective view of the inorganic fiber present in the vicinity of the second main surface of the holding seal material and a cross-sectional view schematically illustrating an enlarged part of a cross-section of the inorganic fiber.

FIG. 2A illustrates the inorganic fiber present in the vicinity of the first main surface 14 of the holding seal material, and an inorganic fiber 21 is coated with a skin layer 22 including the inorganic particles. The thickness of the skin layer 22 is the thickness represented by X in FIG. 2A.

The thickness X of the skin layer is computed by removing five inorganic fibers present in the vicinity of the first main surface of the holding seal material, photographing the cross-sections of the inorganic fibers using a transmission electron microscope (TEM) so as to measure the thicknesses of the skin layers of the respective inorganic fibers, and calculating the average value of the thicknesses of the skin layers of the five inorganic fiber.

The thickness of the skin layer of each of the inorganic fibers is computed by specifying three measurement locations in each of the inorganic fibers, and calculating the average value of the thickness of the measured skin layer.

Figure 3:
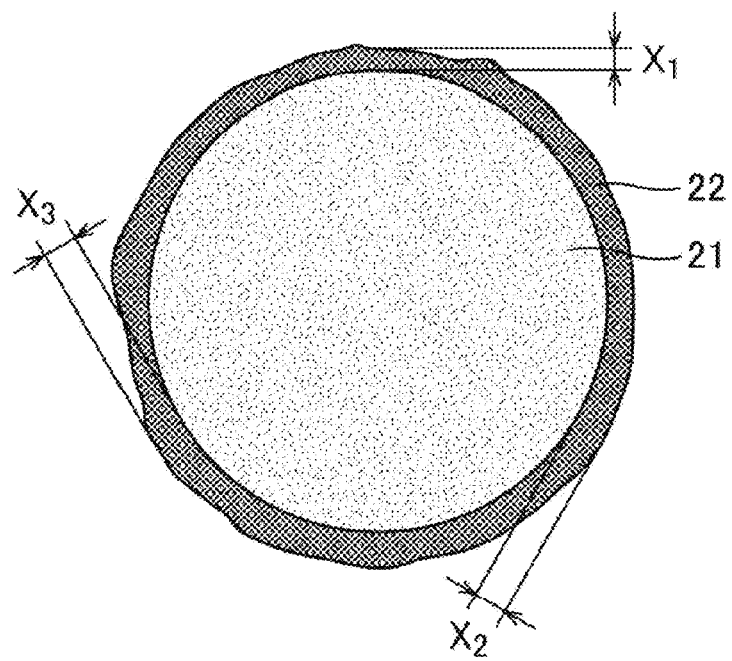
FIG. 3 is a cross-sectional view schematically illustrating an example of measurement locations when the thicknesses of the skin layers of the respective inorganic fibers are measured.

FIG. 3 is a cross-sectional view schematically illustrating an example of measurement locations when the thickness of the skin layer of an inorganic fiber is measured.

FIG. 3 illustrates three measurement locations of the thickness of the skin layer, and the thicknesses of the skin layer, which are measured at the respective measurement locations, are X1, X2 and X3.

The thickness of the skin layer of each of the inorganic fibers is computed using the average value of X1, X2 and X3, that is, the following formula.

The thickness of the skin layer of each of the inorganic fibers=(X1+X2+X3)/3

A value obtained by computing the thicknesses of the skin layers of the respective inorganic fibers in the above manner and averaging the thicknesses of the skin layers of the five removed inorganic fibers becomes the thickness X of the skin layer.

FIG. 2B illustrates the inorganic fiber present in the vicinity of the center 15 of the holding seal material, and the inorganic fiber 21 is coated with the skin layer 22 including the inorganic particles. The thickness of the skin layer 22 is the thickness represented by Y in FIG. 2B.

The thickness Y of the skin layer of the inorganic fibers in the vicinity of the center of the holding seal material in the thickness direction is smaller than the thickness X of the skin layer of the inorganic fibers in the vicinity of the first main surface.

The method of computing the thickness Y of the skin layer is the same as the above method of computing the thickness of the skin layer X.

FIG. 2C illustrates the inorganic fiber present in the vicinity of the second main surface 16 of the holding seal material, and the inorganic fiber 21 is coated with the skin layer 22 including the inorganic particles. The thickness of the skin layer 22 is the thickness represented by Z in FIG. 2C.

The thickness Z of the skin layer of the inorganic fibers in the vicinity of the second main surface is smaller than the thickness X of the skin layer of the inorganic fibers in the vicinity of the first main surface. In addition, the thickness Z of the skin layer is smaller than the thickness Y of the skin layer.

The method of computing the thickness Y of the skin layer is the same as the above method of computing the thickness of the skin layer X.

The thickness X of the skin layer is desirably 15 nm to 900 nm, the thickness Y of the skin layer is desirably 10 nm to 700 nm, and the thickness Z of the skin layer is desirably 5 nm to 500 nm.

The thickness of the skin layer changes depending on the diameter of the inorganic fiber, the particle size, shape, and attached amount of the inorganic particles.

In the holding seal material 1 of the embodiment, when the attachment ratio of the inorganic particles in the vicinity of the first main surface is represented by $\alpha$, the attachment ratio of the inorganic particles in the vicinity of the center of the holding seal material in the thickness direction is represented by $\beta$, and the attachment ratio of the inorganic particles in the vicinity of the second main surface is represented by $\gamma$, the relationship of $\alpha > \beta > \gamma$ is desirably satisfied.

The attachment ratio of the inorganic particles refers to a numeric value of the weight of the inorganic particles included in the holding seal material, represented by weight %, when the weight of the inorganic fibers included in the holding seal material is set to 100 weight %.

In order to obtain $\alpha$, $\beta$ and $\gamma$ respectively, it is necessary to sample some of the holding seal material as measurement samples from the vicinity of the first main surface, the vicinity of the center of the holding seal material in the thickness direction, and the vicinity of the second main surface respectively, and obtain the attachment ratios of the inorganic particles in the respective areas.

The amount of the inorganic particles can be determined by determining the amounts of elements included in the inorganic particles. As the method of determining the amount, an appropriate method may be selected depending on the types of elements included in the inorganic particles. For example, in a case in which the inorganic particles are alumina particles, it is possible to determine the amount of the aluminum component by carrying out back titration (chelate titration method) using a zinc standard solution, and to compute the attachment ratio of the alumina particles.

In a method of analyzing the attachment ratio of silica particles or titania particles as the inorganic particles, an inductively coupled plasma atomic emission spectrometer (ICP-AES) can be used. The attachment ratios of the inorganic particles can be computed in the respective areas by obtaining the attachment amounts of the inorganic particles by comparing the concentrations of metal before and after the attachment of the inorganic particles.

The attachment ratio $\alpha$ is desirably 0.3 weight % to 5.0 weight %, the attachment ratio $\beta$ is desirably 0.2 weight % to 4.0 weight %, and the attachment ratio $\gamma$ is desirably 0.1 weight % to 3.0 weight %.

In addition, the attachment ratio of the inorganic particles in the entire holding seal material is desirably 0.3 weight % to 4.0 weight %.

In a case in which the attachment ratio of the inorganic particles in the entire holding seal material is measured, the attachment ratio is computed by measuring the weight of the entire holding seal material, and determining the weight of the inorganic particles included in the holding seal material.

On the holding seal material 1, a needle punching treatment is desirably carried out in order to form the entanglement of the inorganic fibers.

The needle punching treatment refers to the insertion and removal of means for entangling the fibers, such as a needle, from a sheet-shaped substance that is the precursor of the inorganic fibers. In the holding seal material 1, the inorganic fibers having a relatively long average fiber length are three-dimensionally entangled through the needle punching treatment. That is, the needle punching treatment is carried out on the holding seal material 1 in the width direction perpendicular to the longitudinal direction so that the inorganic fibers are entangled with each other. The precursor of the inorganic fibers will be described in the method of manufacturing a holding seal material described below.

The needle punching treatment can appropriately reduce the bulk of the holding seal material 1 so that it is possible to increase the work efficiency during canning, and to increase the contact pressure of the holding seal material 1 using the entanglement of the inorganic fibers.

Meanwhile, the average fiber length of the inorganic fibers needs to be long to a certain extent in order to exhibit an interrelated structure.

For example, the average fiber length of the inorganic fibers is desirably 50 μm to 100 mm. In addition, the average diameter of the inorganic fibers is desirably 2 μm to 10 μm.

Next, a method of manufacturing a holding seal material according to the first embodiment of the invention will be described.

The method of manufacturing a holding seal material according to the first embodiment of the invention is suitable as a method of manufacturing a holding seal material according to the first embodiment of the invention described above.

The method of manufacturing a holding seal material according to the embodiment includes a mat preparation process of preparing a mat for the holding seal material made of inorganic fibers, on which the needle punching treatment has been carried out, a process of bringing an inorganic binder including inorganic particles and water into contact with the mat, and impregnating the inorganic binder in the mat, a dewatering process of carrying out a dewatering treatment on the mat to which the inorganic binder is attached, and a drying process of drying moisture attached to the mat.

(a) Mat Preparation Process

In the method of manufacturing a holding seal material according to the embodiment, first, a mat preparation process, in which a mat for a holding seal material made of inorganic fibers, on which a needle punching treatment has been carried out, is prepared, is carried out.

A mat that configures the holding seal material of the embodiment can be obtained using a variety of methods, and, for example, the mat can be manufactured using the following method. That is, first, a mixture for spinning made of raw materials of an aqueous solution of basic aluminum chloride, a silica sol, and the like is spun using a blowing method so as to manufacture an inorganic fiber precursor having an average fiber diameter of 3 μm to 10 μm. Subsequently, the inorganic fiber precursor is compressed so as to manufacture a continuous sheet-shaped substance having a predetermined size, a needle punching treatment is carried out on the sheet-shaped substance, and then a firing treatment is carried out, thereby completing the preparation of the mat for a holding seal material.

(b) Impregnating Process

Next, an impregnating process, in which the mat is brought into contact with an inorganic binder including inorganic particles and water so as to impregnate the inorganic binder into the mat, is carried out.

As the inorganic binder, a liquid, such as an alumina sol, a silica sol, a titania sol or a colloid dispersion liquid thereof, can be used; however, since there are cases in which the concentration of the inorganic binder is too high in a commercially available undiluted solution, it is desirable to use a solution, which is diluted so that the concentration of the inorganic particles becomes approximately 0.5 weight % to 5 weight % in terms of the solid content, as the inorganic binder.

In the impregnating process, the method of bringing the mat into contact with the inorganic binder including the inorganic particles and water is not particularly limited. For example, the inorganic binder may be impregnated in the mat by immersing the mat in the inorganic binder including the inorganic particles and water, or the inorganic binder may be impregnated in the mat by dropping the inorganic binder including the inorganic particles and water onto the mat using a method, such as a curtain coating method.

In addition, in a case in which an alumina sol is used as the inorganic binder, an alumina sol including alumina particles having a chain shape as the shape of the secondary particles in an aqueous solution (in the inorganic binder) (for example, AS550 manufactured by Nissan Chemical Industries, Ltd.) is desirably used.

(c) Dewatering Process

Next, the mat to which the inorganic binder has been attached is subjected to a dewatering treatment.

In this process, the mat, to which the inorganic binder has been attached, is dewatered in a suctioning manner, whereby the attached amount of the inorganic binder can be approximately adjusted.

(d) Drying Process

After that, a drying process in which the mat, to which the inorganic binder has been attached, is dried at a temperature of approximately 100° C. to 150° C. is carried out, and moisture is evaporated, thereby producing a mat to which the inorganic particles have been attached.

Heating and hot air drying can be used as the drying method, and the thicknesses X, Y and Z of the skin layers and the attachment ratios $\alpha$, $\beta$ and $\gamma$ of the inorganic particles can be adjusted by changing the conditions of the heating and hot air drying.

During the heating and hot air drying, the bias of the inorganic binder can be adjusted by changing the speed of the hot air.

The temperature of the hot air is 100° C. to 150° C., and, in a case in which the hot air is blown so as to hit a main surface of the mat, the inorganic binder is biased as follows.

When the speed of the air is less than 1.0 m/s, the attached amount of the inorganic binder becomes largest in the vicinity of the main surface to which the hot air has been blown, second largest in the vicinity of the main surface on the opposite side of the main surface to which the hot air has been blown, and third largest in the vicinity of the center in the thickness direction.

When the speed of the air is 1.0 m/s or more and less than 1.5 m/s, the attached amount of the inorganic binder becomes uniform in the thickness direction.

When the speed of the air is 1.5 m/s or more, the attached amount of the inorganic binder becomes largest in the vicinity of the main surface on the opposite side of the main surface to which the hot air has been blown, second largest in the vicinity of the center in the thickness direction, and third largest in the vicinity of the main surface to which the hot air has been blown.

The above tendency implies that, when the hot air is blown so as to hit the second main surface of the mat at a speed of the air of 1.5 m/s or more, since the inorganic binder is biased in the vicinity of the first main surface of the mat, the thickness X of the skin layer increases. In addition, since the thickness Z of the skin layer becomes smallest, a holding seal material that satisfies a relational expression of X>Y>Z, which also includes the thickness Y of the skin layer, is produced.

In addition, it is also possible to produce a holding seal material in which the attachment ratio of the inorganic particles satisfies a relational expression of $\alpha>\beta>\gamma$.

The speed of the air during the heating and hot air drying is desirably 1.5 m/s to 2.5 m/s.

During the heating and hot air drying, it is desirable to blow hot air from one main surface (desirably the second main surface) of the mat toward the other main surface in a state in which the top and bottom of the mat is pinched using plates having air holes so that an excess load is not applied to the mat, and ventilate the hot air to the mat through the air holes.

The mat that has undergone the above processes becomes the holding seal material of the embodiment.

In addition, in order to produce a holding seal material having a shape with a protrusion portion and a recess portion as illustrated in FIG. 1, a cutting process, in which the holding seal material is cut into a predetermined shape, may be further carried out.

(Exhaust Gas Purifying Apparatus)

The holding seal material according to the first embodiment of the invention is used as a holding seal material of an exhaust gas purifying apparatus.

Hereinafter, the exhaust gas purifying apparatus according to the first embodiment of the invention will be described.

Figure 4:
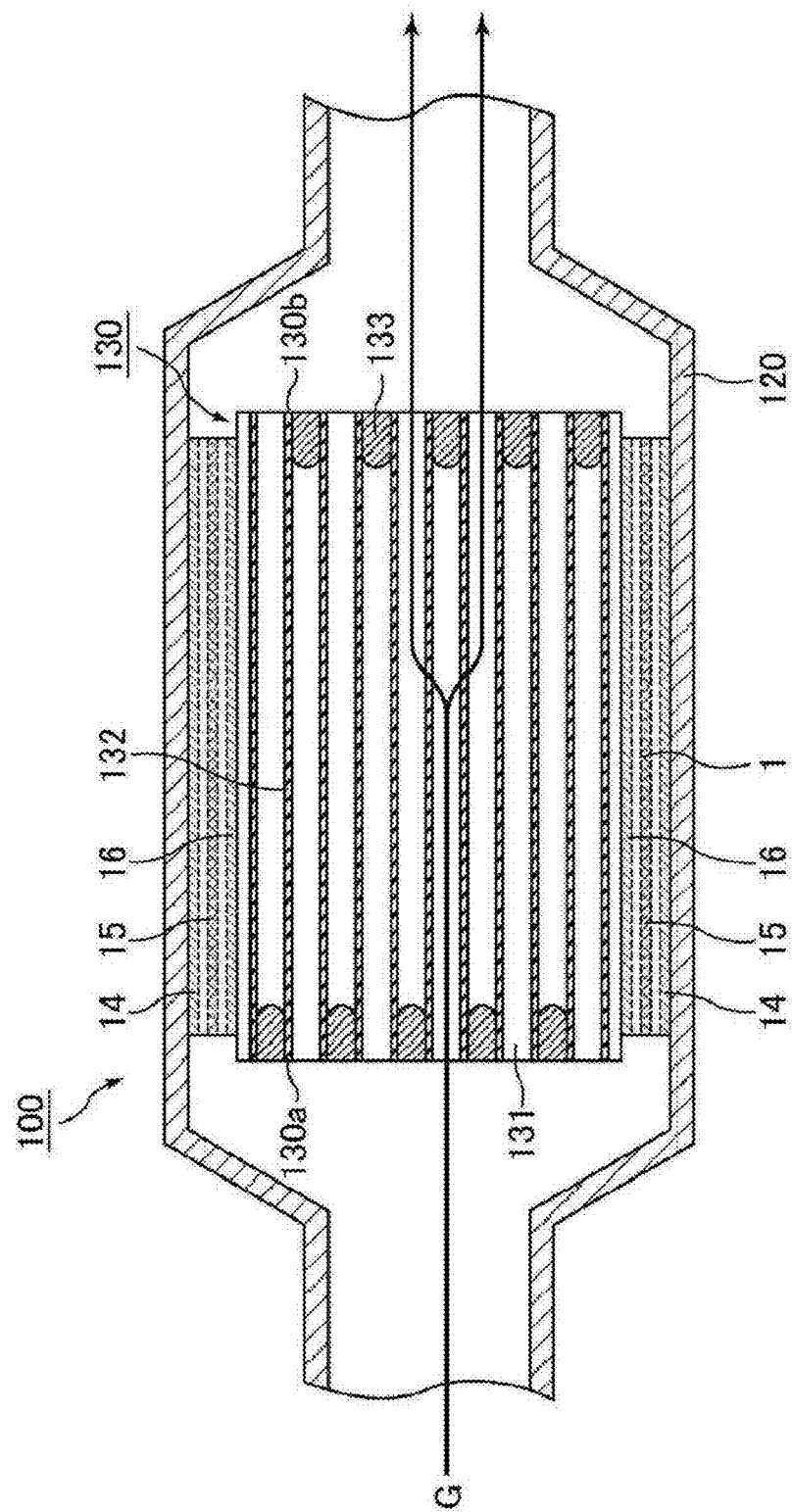
FIG. 4 is a cross-sectional view schematically illustrating an example of an exhaust gas purifying apparatus according to the first embodiment of the invention.

FIG. 4 is a cross-sectional view schematically illustrating an example of the exhaust gas purifying apparatus according to the first embodiment of the invention.

As illustrated in FIG. 4, the exhaust gas purifying apparatus 100 according to the first embodiment of the invention has a casing 120, an exhaust gas treatment body 130 accommodated in the casing 120, and a holding seal material 1 disposed between the exhaust gas treatment body 130 and the casing 120.

The exhaust gas treatment body 130 is a columnar body having a number of cells 131 lined up in the longitudinal direction with cell walls 132 therebetween. Meanwhile, an introduction pipe, through which exhaust gas exhausted from an internal combustion engine is introduced, and an exhaust pipe, through which exhaust gas that has passed through the exhaust gas purifying apparatus is exhausted outside, are connected to the end portions of the casing 120 as necessary.

Meanwhile, in the exhaust gas purifying apparatus 100 illustrated in FIG. 4, an exhaust gas filter (honeycomb filter), in which any side of each cell is sealed with a sealing material 133, is used as the exhaust gas treatment body 130, but a catalyst carrier, in which any end surfaces are not sealed with a sealing material, may be used.

In the exhaust gas purifying apparatus 100 illustrated in FIG. 4, the holding seal material 1 illustrated in FIG. 1 is used as the holding seal material.

The holding seal material 1 is preferably disposed so that the first main surface 14 is located on the casing side, and the second main surface 16 is located on the exhaust gas treatment body side.

This is because the vicinity of the second main surface of the holding seal material is relatively flexible and easy to bend, and therefore the second main surface is preferably disposed on the exhaust gas treatment body side at which the holding seal material is bent at an abrupt angle.

A case in which exhaust gas passes through the exhaust gas purifying apparatus 100 having the above configuration will be described with reference to FIG. 4.

As illustrated in FIG. 4, exhaust gas, which has been exhausted from an internal combustion engine and has flowed into the exhaust gas purifying apparatus 100 (in FIG. 4, the exhaust gas is represented by G, and the flow of the exhaust gas is represented using arrows), flows into a cell 131 opened on an end surface on the exhaust gas inflow side 130a of the exhaust gas treatment body (honeycomb filter) 130, and passes through the cell wall 132 separating the cells 131. At this time, PM in the exhaust gas is trapped at the cell walls 132 so that the exhaust gas is purified. The purified exhaust gas flows out through another cell 131 opened on an end surface on the exhaust gas outflow side 130b, and is exhausted outside.

Next, the exhaust gas treatment body (honeycomb filter) and the casing, which configure the exhaust gas purifying apparatus according to the first embodiment of the invention, will be described.

Meanwhile, since the configuration of the holding seal material that configures the exhaust gas purifying apparatus has already been described as the holding seal material of the first embodiment of the invention, the configuration will not be described.

First, the exhaust gas treatment body that configures the exhaust gas purifying apparatus will be described.

Figure 5:
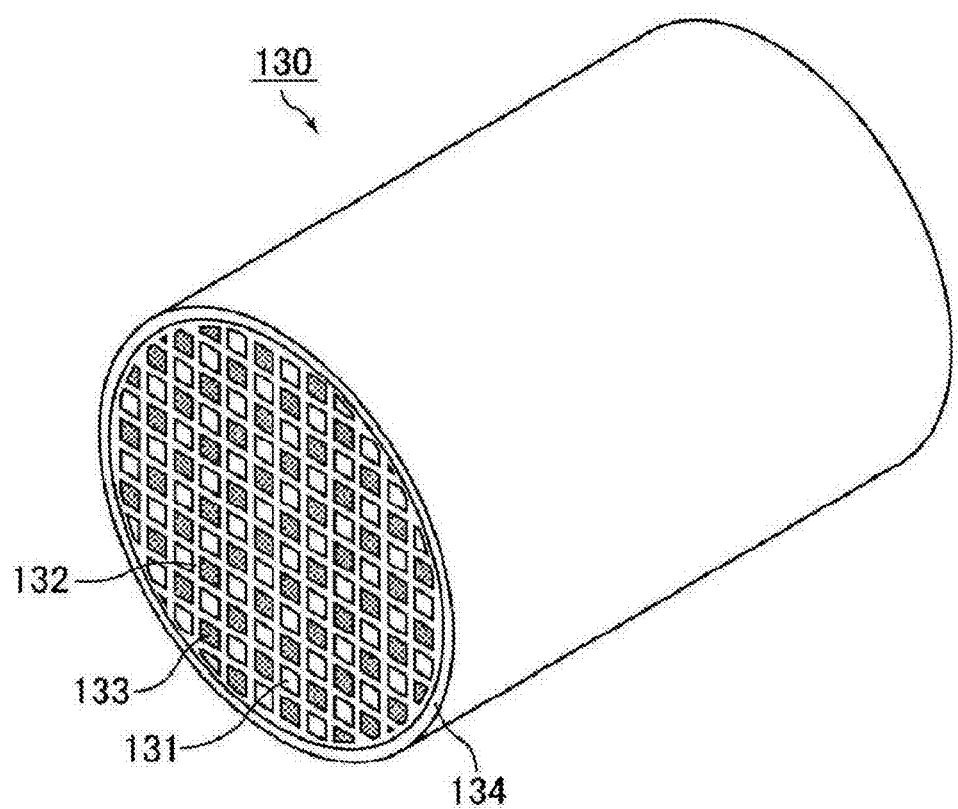
FIG. 5 is a perspective view schematically illustrating an example of an exhaust gas treatment body that configures the exhaust gas purifying apparatus according to the first embodiment of the invention.

FIG. 5 is a perspective view schematically illustrating an example of the exhaust gas treatment body that configures the exhaust gas purifying apparatus according to the first embodiment of the invention.

As illustrated in FIG. 5, the exhaust gas treatment body (honeycomb) 130 is made mainly of a porous ceramic, and the shape thereof is substantially columnar. In addition, an outer circumferential coat layer 134 is provided at the outer circumference of the honeycomb filter 130 for the purpose of reinforcing the outer circumferential portion of the honeycomb filter 130, trimming the shape or improving the heat insulating properties of the honeycomb filter 130.

Meanwhile, the configuration of the inside of the honeycomb filter 130 is as already described in the description of the exhaust gas purifying apparatus according to the first embodiment of the invention (refer to FIG. 4).

Next, the casing that configures the exhaust gas purifying apparatus will be described.

Figure 6:
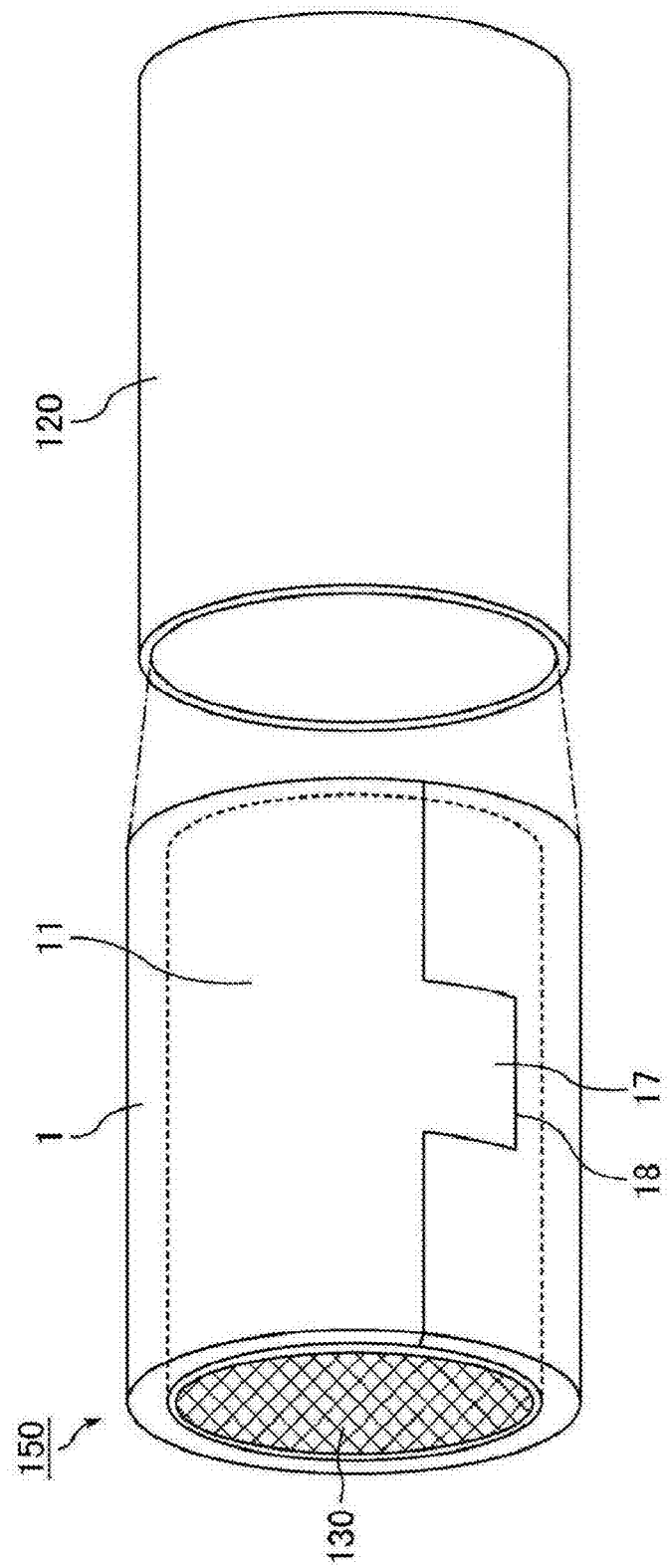
FIG. 6 is a perspective view schematically illustrating an example of a method of manufacturing an exhaust gas purifying apparatus according to the first embodiment of the invention.

The casing 120 is made mainly of a metal, such as stainless steel, and the shape thereof may be, as illustrated in FIG. 6, a substantially cylindrical shape having a smaller inner diameter at both end portions than the inner diameter at the center portion, or a substantially cylindrical shape having a uniform inner diameter.

The inner diameter of the casing (the inner diameter at a portion that accommodates the exhaust gas treatment body) is preferably slightly shorter than the combined length of the diameter of the end surface of the exhaust gas treatment body and the thickness of the holding seal material in a state of being wound around the exhaust gas treatment body.

Next, a method of manufacturing an exhaust gas purifying apparatus according to the first embodiment of the invention will be described.

FIG. 6 is a perspective view schematically illustrating an example of the method of manufacturing an exhaust gas purifying apparatus according to the first embodiment of the invention. FIG. 6 illustrates an example in which a casing has a substantially cylindrical shape with a uniform inner diameter.

First, a winding process, in which a wound body (the exhaust gas treatment body around which the holding seal material is wound) 150 is manufactured by winding the holding seal material 1 illustrated in FIG. 1 around the exhaust gas treatment body (honeycomb filter) 130, is carried out.

In the winding process, the holding seal material 1 is wound around the outer circumference of the substantially columnar exhaust gas treatment body 130, which has been manufactured using a well-known method of the related art, so that the protrusion portions 17 and the recess portions 18 engage with each other.

In the winding process, the second main surface 16 of the holding seal material 1 is preferably wound so as to come into contact with the outer circumference of the exhaust gas treatment body 130.

As a result, the wound body 150 that is the exhaust gas treatment body 130, around which the holding seal material 1 has been wound, can be manufactured.

Next, an accommodating process, in which the manufactured wound body 150 is accommodated in the casing 120 made mainly of a metal or the like, is carried out.

In order for the holding seal material to be compressed so as to exhibit a predetermined repulsive force (that is, a force that holds the exhaust gas treatment body) after accommodation, the inner diameter of the casing 120 is formed to be smaller than the outermost diameter which includes the thickness of the holding seal material 1 of the exhaust gas treatment body 130, around which the holding seal material 1 has been wound.

The exhaust gas purifying apparatus 100 illustrated in FIG. 4 can be manufactured using the above method.

Regarding the accommodating process, examples of a method of accommodating the wound body in the casing include a pressing method (stuffing method) in which the wound body is pressed into a predetermined location in the casing, a sizing method (swaging method) in which the wound body is inserted into the inside of the casing, and then the casing is compressed from the outer circumferential side so that the inner diameter of the casing contracts, a clam shell method in which the casing is made into a shape that can be separated into two components of a first casing and a second casing, the wound body is placed on the first casing, then covered with the second casing, and sealed, and the like.

Hereinafter, the actions and effects of the holding seal material, the method of manufacturing a holding seal material, and the exhaust gas purifying apparatus according to the first embodiment of the invention will be listed.

(1) In the holding seal material of the embodiment of the invention, the inorganic fibers are coated with the skin layer including the inorganic particles, and the thickness of the skin layer of the inorganic fibers is thick in the vicinity of the first main surface.

In the vicinity of the first main surface, in which the thickness of the skin layer is thick, since the attached amount of the inorganic particles is large, the protrusions and the recesses on the surface of the inorganic fibers become large, the friction between the inorganic fibers increases, and the contact pressure becomes extremely large.

In addition, in the vicinity of the center of the holding seal material in the thickness direction and in the vicinity of the second main surface, the thicknesses of the skin layers are thinner than the thickness of the skin layer in the vicinity of the first main surface.

When the thickness of the skin layer is thin, since the attached amount of the inorganic particles is small, the holding seal material becomes easily bendable.

In addition, even in the vicinity of the center in the thickness direction and in the vicinity of the second main surface, the effect of improving the contact pressure by the attachment of the inorganic particles can be obtained.

As such, a holding seal material which has the effect of improving the contact pressure and is easily bendable can be produced by changing the thicknesses of the skin layers of the inorganic fibers in the thickness direction of the holding seal material.

(2) In the holding seal material of the embodiment of the invention, the attachment ratio of the inorganic particles is desirably high in the vicinity of the first main surface.

In a case in which the sizes of the inorganic fibers change in the thickness direction of the holding seal material, specifically, in a case in which the sizes of the inorganic fibers are small in the vicinity of the first main surface, there are cases in which the magnitude relationship of the thicknesses of the skin layers of the inorganic fibers is different from the magnitude relationship of the attachment ratio of the inorganic particles.

When the inorganic particles are attached so that the magnitude relationship of the thicknesses of the skin layers of the inorganic fibers is satisfied, and the magnitude relationship of the attachment ratios of the inorganic particles is satisfied, an effect of improving the contact pressure in the vicinity of the first main surface, in which the attached amount of the inorganic particles is relatively large, and an effect of improving the bending properties in the vicinity of the center of the holding seal material in the thickness direction and in the vicinity of the second main surface, in which the attached amounts of the inorganic particles are relatively small, can be more preferably obtained.

(3) In the holding seal material of the embodiment, the attachment ratio of the inorganic particles in the entire holding seal material is desirably 0.3 weight % to 4.0 weight %.

When the attached amount of the inorganic particles is less than 0.3 weight % in the entire holding seal material, there are cases in which the holding force is insufficient even when the thicknesses of the skin layers are changed in the thickness direction of the holding seal material.

In addition, when the attached amount of the inorganic particles exceeds 4.0 weight % in the entire holding seal material, there are cases in which the holding seal material is not easily bendable even when the thicknesses of the skin layers are changed in the thickness direction of the holding seal material.

(4) The holding seal material of the embodiment is a holding seal material obtained from a mat made of inorganic fibers on which a needle punching treatment has been carried out.

When the inorganic fibers become interrelated by carrying out the needle punching treatment, the bulk of the holding seal material can be appropriately reduced so that it is possible to increase the work efficiency during canning, and to increase the contact pressure of the holding seal material using the entanglement of the inorganic fibers.

(5) In the method of manufacturing a holding seal material of the embodiment, the holding seal material is manufactured by undergoing the mat preparation process, the impregnating process, the dewatering process and the drying process.

Particularly, the thicknesses X, Y and Z of the skin layers and the attachment ratios α, β and γ of the inorganic particles can be adjusted by changing the conditions of the heating and hot air drying, and the holding seal material of the embodiment can be manufactured.

(6) In the method of manufacturing a holding seal material of the embodiment, the inorganic particles are alumina particles, and the shapes of the secondary particles of the alumina particles in the inorganic binder are a chain shape.

When chain-shaped alumina particles are used, since the entanglement of the secondary particles is large, and the secondary particles are attached to the surfaces of the inorganic fibers while the particles join to each other, it is possible to increase the uniformity in the thickness of the skin layer. Therefore, the characteristics of the holding seal material are stably exhibited.

(7) The exhaust gas purifying apparatus of the embodiment is an exhaust gas purifying apparatus having the exhaust gas treatment body, the metal casing that accommodates the exhaust gas treatment body, and the holding seal material which is disposed between the exhaust gas treatment body and the metal casing, and holds the exhaust gas treatment body, in which the holding seal material is the holding seal material of the embodiment.

When the holding seal material of the embodiment of the invention is used as the holding seal material, it is possible to produce an exhaust gas purifying apparatus in which the holding seal material is wound around the exhaust gas treatment body in a state of having no winding wrinkles or cracking, and the exhaust gas treatment body is held with a high holding force.

Hereinafter, examples, in which the first embodiment of the invention will be disclosed more specifically, will be described. Meanwhile, the invention is not limited to the examples.

EXAMPLE 1

(a) Mat Preparation Process

First, a mat for a holding seal material was prepared in the following order.

(a-1) Spinning Process

A silica sol was blended with an aqueous solution of basic aluminum chloride, which had been prepared to have a content of Al of 70 g/l and Al:Cl=1:1.8 (atomic ratio), so that the composition ratio in a fired inorganic fiber became $Al_2O_3$: $SiO_2$=72:28 (weight ratio), and, furthermore, an appropriate amount of an organic polymer (polyvinyl alcohol) was added, thereby preparing a liquid mixture.

The obtained liquid mixture was concentrated so as to produce a mixture for spinning, and the mixture for spinning was spun using a blowing method, thereby manufacturing an inorganic fiber precursor having an average fiber diameter of 5.1 μm.

(a-2) Compression Process

The inorganic fiber precursor obtained in the above process (1) was compressed so as to manufacture a continuous sheet-shaped substance.

(a-3) Needle Punching Process

A needle punching process was continuously carried out on the sheet-shaped substance obtained in the above process (2) using the conditions described below, thereby manufacturing a needle punching treated body.

First, a needle board, to which needles were attached at a density of 21 needles/cm², was prepared. Next, the needle board was disposed above one surface of the sheet-shaped substance, and the needle punching treatment was carried out by vertically moving the needle board once in the thickness direction of the sheet-shaped substance, thereby manufacturing a needle punch treated body. At this time, the needles were moved until the barbs formed at the front end portions of the needles completely penetrated to the opposite surface of the sheet-shaped substance.

(a-4) Firing Process

The needle punching treated body obtained in the above process (3) was continuously fired at a peak temperature of 1250° C. so as to manufacture a fired sheet-shaped substance made of inorganic fibers including alumina and silica at 72 parts by weight: 28 parts by weight. The average fiber diameter of the inorganic fibers was 5.1 μm, and the minimum value of the inorganic fiber diameter was 3.2 μm. The inorganic fibers obtained in the above manner had a gap bulk density of 0.15 g/cm$^3$ and a fiber density of 1400 g/m$^2$.

(a-5) Cutting Process

The fired sheet-shaped substance obtained in the above process (4) was cut so as to prepare a cut sheet-shaped substance (matt).

(b) Impregnating Process

A commercially available alumina sol (alumina sol solution AS550 manufactured by Nissan Chemical Industries, Ltd. (concentration of the solid content: 15 weight %)) was diluted using water so as to manufacture an inorganic binder including inorganic particles and water with a concentration of the solid content of 1 weight %. The inorganic binder was brought into contact with the mat using a curtain coating method so as to impregnate the inorganic binder in the mat.

(c) Dewatering Process

Adjustment was made by suctioning and dewatering the mat, to which the inorganic binder had been attached, using a dewatering device so as to form a state in which 50 weight % of the inorganic binder was attached to 100 weight % of the inorganic fibers. Since the concentration of the solid content of the inorganic particles in the inorganic binder is 1 weight %, the attached amount of the inorganic particles per unit weight of the inorganic fibers becomes 0.5 g/100 g in terms of the solid content.

(d) Drying Process

Next, the mat, to which the inorganic binder had been attached, was heated and dried using hot air at a temperature of 130° C. and a speed of the air of 2.0 m/s, thereby obtaining a mat to which the inorganic particles were attached.

In the drying process, hot air was blown from one main surface (a surface that would become a second main surface) of the mat toward the other main surface (a surface that would become a first main surface) in a state in which the top and bottom of the mat was pinched using plates having air holes so that an excess load was not applied to the mat, and the hot air was ventilated to the mat through the air holes.

(e) Cutting Treatment

The mat obtained in the above manner was cut so that the dimensions in a planar view became a total length of 776 mm×a width of 290 mm, a protrusion portion having a length L of 40 mm and a width W of 100 mm was formed at one end, and a recess portion that would engage with the protrusion portion was formed at the other end, thereby completing the manufacturing of the holding seal material.

EXAMPLES 2 and 3

Holding seal materials were manufactured in the same manner as in Example 1 except that the attached amount of the inorganic particles per unit weight of the inorganic fibers was changed by changing the suctioning and dewatering conditions in the dewatering process.

In Example 2, adjustment was made so as to form a state in which 100 weight % of the inorganic binder was attached to a weight of the inorganic fibers of 100 weight %.

Since the concentration of the solid content of the inorganic particles in the inorganic binder is 1 weight %, the attached amount of the inorganic particles per unit weight of the inorganic fibers becomes 1.0 g/100 g in terms of the solid content.

In Example 3, adjustment was made so as to form a state in which 300 weight % of the inorganic binder was attached to 100 weight % of the inorganic fibers.

Since the concentration of the solid content of the inorganic particles in the inorganic binder was 1 weight %, the attached amount of the inorganic particles per unit weight of the inorganic fibers became 3.0 g/100 g in terms of the solid content.

COMPARATIVE EXAMPLE 1

A holding seal material was manufactured in the same manner as in Example 1 except that the impregnating process, in which the inorganic binder was impregnated in the mat, the dewatering process and the drying process were not carried out.

COMPARATIVE EXAMPLE 2

A holding seal material was manufactured in the same manner as in Example 2 except that the conditions of the heating and hot air drying in the drying process were changed to a temperature of 130° C. and a speed of the air of 1.2 m/s so that the attachment ratio of the inorganic particles became uniform in the thickness direction of the holding seal material.

COMPARATIVE EXAMPLE 3

A holding seal material was manufactured in the same manner as in Example 3 except that the conditions of the heating and hot air drying in the drying process were changed to a temperature of 130° C. and a speed of the air of 1.2 m/s so that the attachment ratio of the inorganic particles became uniform in the thickness direction of the holding seal material.

The following evaluations were carried out on the holding seal materials manufactured in the respective examples and the respective comparative examples.

(Measurement of the Thicknesses of the Skin Layers)

As described in the description of the holding seal material of the first embodiment of the invention, the thicknesses of the skin layers were measured by observing the cross-sections of the inorganic fibers present respectively in the vicinity of the first main surface of the holding seal material, in the vicinity of the center of the holding seal material in the thickness direction, and in the vicinity of the second main surface.

Figure 7A:
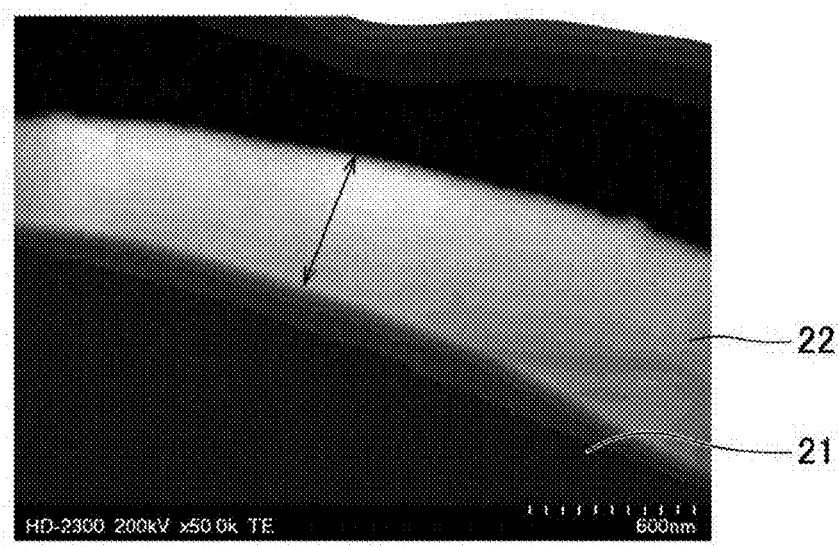
FIG. 7A is an example of a photograph of a part of a cross-section of an inorganic fiber photographed using a transmission electron microscope (TEM).

FIG. 7A is an example of a photograph of a part of a cross-section of an inorganic fiber photographed using a transmission electron microscope (TEM), which is photographed at an accelerating voltage of 200 kV and a magnification of 50000 times. Meanwhile, the photograph illustrated in FIG. 7A is a photograph of a cross-section of a holding seal material manufactured, similarly to Example 3, under a condition in which the attached amount of the inorganic particles per unit weight of the inorganic fibers becomes 3.0 g/100 g in terms of the solid content.

This photograph shows the inorganic fiber 21 and the skin layer 22, and the thickness of the skin layer at one measurement location is indicated using a double-headed arrow.

Regarding the thickness of the skin layer, as illustrated in FIG. 3, measurements were made at three measurement locations in an inorganic fiber, and the average value of the thicknesses of the skin layer measured at the three locations was used as the thickness of the skin layer of the inorganic fiber.

In addition, fiver inorganic fibers were removed from the respective areas, and the average values of the thicknesses of the skin layers of the five inorganic fibers were used as the thicknesses (X, Y and Z) of the skin layers of the respective areas.

Figure 7B:
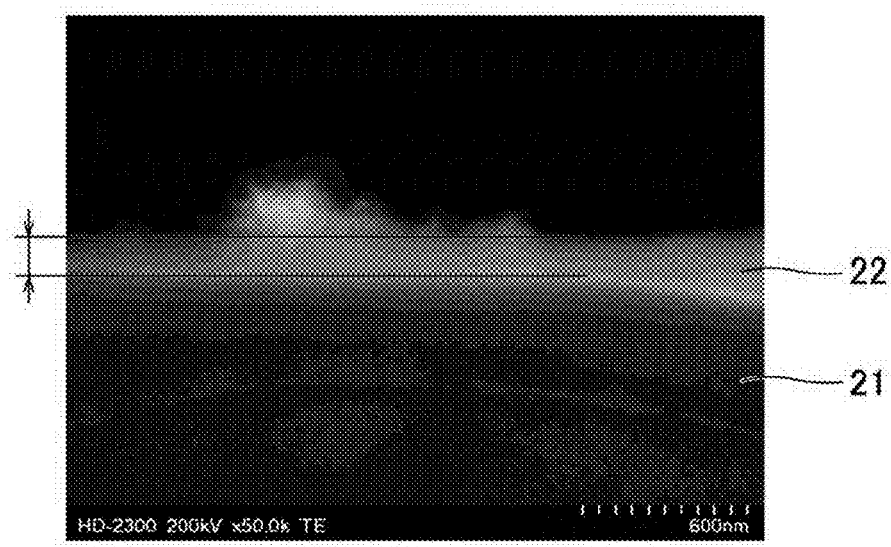
FIG. 7B is a photograph illustrating an example of the handling of a local protrusion portion during the measurement of the thickness of the skin layer.

FIG. 7B is a photograph illustrating an example of the handling of a local protrusion portion during the measurement of the thickness of the skin layer.

In the photograph illustrated in FIG. 7B, a locally raised protrusion portion is observed, but such a protrusion portion is not taken into consideration during the measurement of the thickness of the skin layer, and the width indicated using a double-headed arrow in FIG. 7B is used as the thickness of the skin layer.

As a pretreatment method of the photographing using a TEM, a method in which the cross-section of the inorganic fiber is cut using a focused ion beam (FIB) and observed can be used.

(Measurement of the Attachment Ratio of the Inorganic Particles)

The attachment ratio of alumina as the inorganic particles that had been attached to the inorganic fibers was obtained through back titration (chelate titration method) using alkali fusion/acid dissolution/a zinc standard solution based on the method described in JIS K 1450.

Specifically, the holding seal material (0.2 g) was sampled as samples from the vicinity of the first main surface of the holding seal material, the vicinity of the center of the holding seal material in the thickness direction, and the vicinity of the second main surface of the holding seal material.

The concentrations of aluminum were obtained from the respective samples using the chelate titration method.

Separately, a mat (0.2 g), which did not have an inorganic binder impregnated and did not have the inorganic particles attached, was prepared, and, similarly, the concentration of aluminum was obtained using the chelate titration method.

The attached amount of the inorganic particles were obtained by comparing the concentrations of aluminum before and after the attachment of the inorganic particles, and the attachment ratios of the inorganic particles were computed at the respective areas.

In addition, the attachment ratio of the inorganic particles in the entire holding seal material was also computed using a sample including the entire holding seal material in the thickness direction.

(Contact Pressure Test)

For the holding seal materials obtained in the respective examples and the respective comparative examples, the contact pressures were measured using the following method.

As samples for measuring the contact pressures, cut pieces of the holding seal materials cut into a size of 100 mm×100 mm were used.

Meanwhile, for the measurement of the contact pressure, a hot contact pressure measuring apparatus having a heating heater at a part of a plate that compresses the samples was used.

First, the sample was compressed at a state of room temperature until the gap bulk density (GBD) of the sample became 0.4 g/cm³, and was held for 10 minutes. Meanwhile, the gap bulk density of the sample refers to a value obtained using "the gap bulk density=the weight of the sample/(the area or the sample×the thickness of the sample)".

Next, the sample was released until the gap bulk density reached 0.273 g/cm³ while being heated at 40° C./min in a compressed state until one surface reached 900° C. and the other surface reached 650° C. In addition, the sample was held for 5 minutes in a state in which the temperature of the surface was 900° C., the other surface was 650° C., and the gap bulk density was 0.273 g/cm³.

After that, the sample was compressed at 1 inch (25.4 mm)/min until the gap bulk density became 0.3 g/cm³, and the load at that time was measured. The obtained load was divided by the area of the sample, thereby obtaining the contact pressure (kPa). The results are illustrated in the following Table 1.

(Shear Strength Measurement Test)

Figure 8:
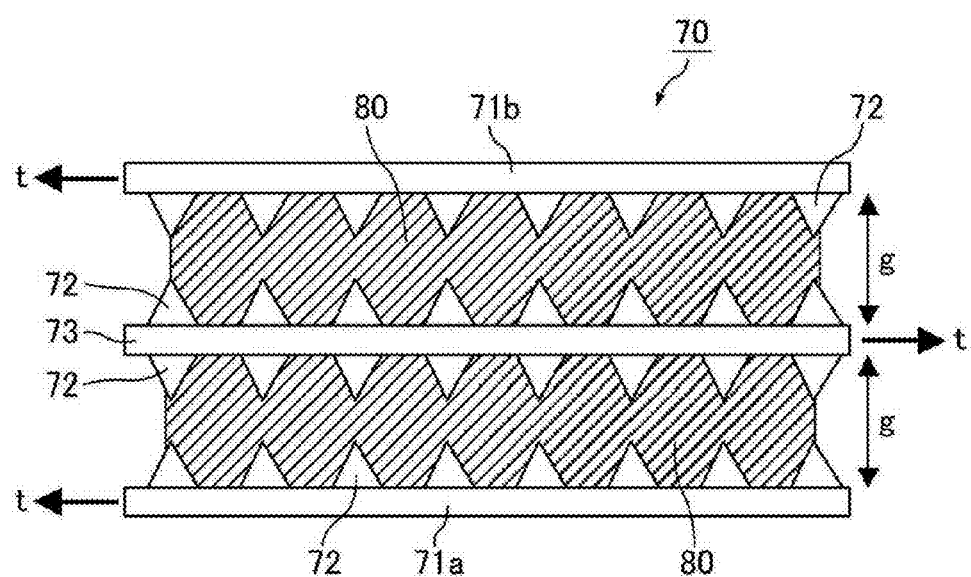
FIG. 8 is a side view schematically illustrating a shear strength tester.

The shear strength measurement test was carried out using a shear strength testing device illustrated in FIG. 8.

FIG. 8 is a side view schematically illustrating a shear strength tester.

A shear strength tester 70 illustrated in FIG. 8 is configured of two SUS plate materials (length 50 mm×width 50 mm×thickness 3 mm) 71a and 71b having 77 conic protrusions (diameter of the bottom surface 1 mm×height 1.6 mm) 72 formed only on one main surface, and an SUS intermediate plate material (length 50 mm×width 50 mm×thickness 3 mm) 73 having 77 conic protrusions (diameter of the bottom surface 1 mm×height 1.6 mm) 72 formed on both main surfaces respectively.

The shear strength was measured using the shear strength tester 70 in the following manner.

First, the manufactured holding seal material was cut into planar view dimensions of 50 mm×50 mm so as to produce a sample for shear strength measurement.

A measurement sample 80 was placed on the main surface of the plate material 71a, on which the protrusions 72 were formed, and the intermediate plate material 73 having the protrusions 72 formed on both surfaces was placed on the sample, thereby pinching the measurement sample 80 at a predetermined interval of g.

Next, another measurement sample 80 was placed on the intermediate plate material 73, and, furthermore, the other plate material 71b was placed on the measurement sample 80 at a predetermined interval g.

Thereby, a total of two measurement samples 80, one in the respective gaps among the three plate materials, were pinched, and compressed.

At this time, the intervals between the three plate materials were adjusted so that the densities of the respective compressed samples 80 became 0.4 g/cm³.

Next, the two top and bottom plate materials 71a and 71b and the intermediate plate material 73 were pulled in mutually opposite directions (the directions indicated using arrows t in FIG. 8), and a stress (N) generated at this time was measured.

(Evaluation of the Bendability)

Figure 9A:
FIGS. 9A to 9C are side views schematically illustrating a bendability evaluation tester.
Figure 9B:
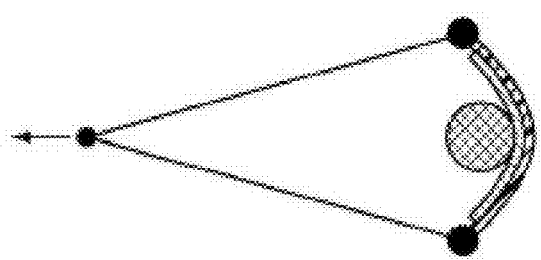
Figure 9C:
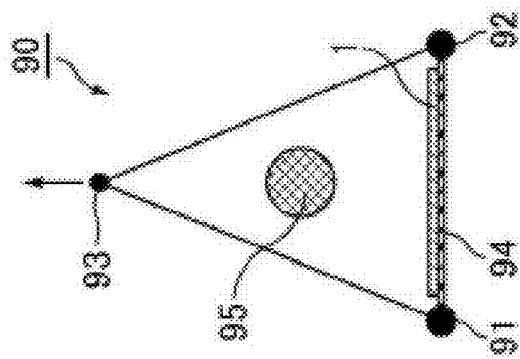

The evaluation of the bendability was carried out using a bendability evaluation tester illustrated in FIGS. 9A to 9C.

FIGS. 9A to 9C are side views schematically illustrating the bendability evaluation tester.

The bendability evaluation tester 90 illustrated in FIG. 9A has a cloth 94 larger than the holding seal material, which is a measurement subject of bendability, a support point 91 and a support point 92 at both ends of the cloth 94, and a lifting starting point 93 that is coupled with the support point 91 and the support point 92, and lifts the support point 91 and the support point 92 upward.

The lifting starting point 93 is connected to a displacement measuring portion and a load measuring portion, which are not shown, so that the displacement of the lifting starting point and the load applied to the lifting starting point are measured when the lifting starting point 93 moves upward. As the displacement measuring portion and the load measuring portion, an ordinarily used displacement-load measuring machine can be used.

When the bendability was evaluated, the holding seal material 1, which had been cut to be smaller than the size of the cloth 94, was placed on the cloth 94. The holding seal material 1 was placed so that the first main surface faced the cloth side (bottom side).

In addition, a metal column 95, in which columnar exhaust gas treatment bodies had been agglomerated, was fixed and placed on the second surface of the holding seal material 1.

In the drawing, the metal column 95 is drawn in a space, but the metal column 95 is in a state in which a columnar cross-sectional portion is fixed to a hard planar plate at an angle. In the drawing, neither the hard planar plate nor the angle are shown.

In addition, the metal column 95 is set so as to be unmovable during the bendability evaluation test.

In the present example and the comparative examples, the size of the holding seal material was set to 50 mm×150 mm, and the size of the exhaust gas treatment body was set to 90 mmφ.

Before the evaluation test of the bendability, the cloth 94 in the bendability evaluation tester is placed on the hard planar plate, and the cloth 94 and the holding seal material 1 are set to be flat as illustrated in FIG. 9A.

The lifting starting point 93, the support point 91 and the support point 92 are relaxed.

Here, when the lifting starting point 93 is moved upward, the support point 91 and the support point 92 are pulled up.

In addition, as illustrated in FIG. 9B, when the holding seal material 1 comes into contact with the metal column 95, a force is applied in a direction in which the holding seal material 1 and the cloth 94 bend. Furthermore, when the lifting starting point is pulled up, as illustrated in FIG. 9C, the holding seal material 1 is wound around the outer circumferential surface of the metal column 95.

Meanwhile, the moving velocity of the lifting starting point 93 was set to 100 mm/min.

Figure 10:
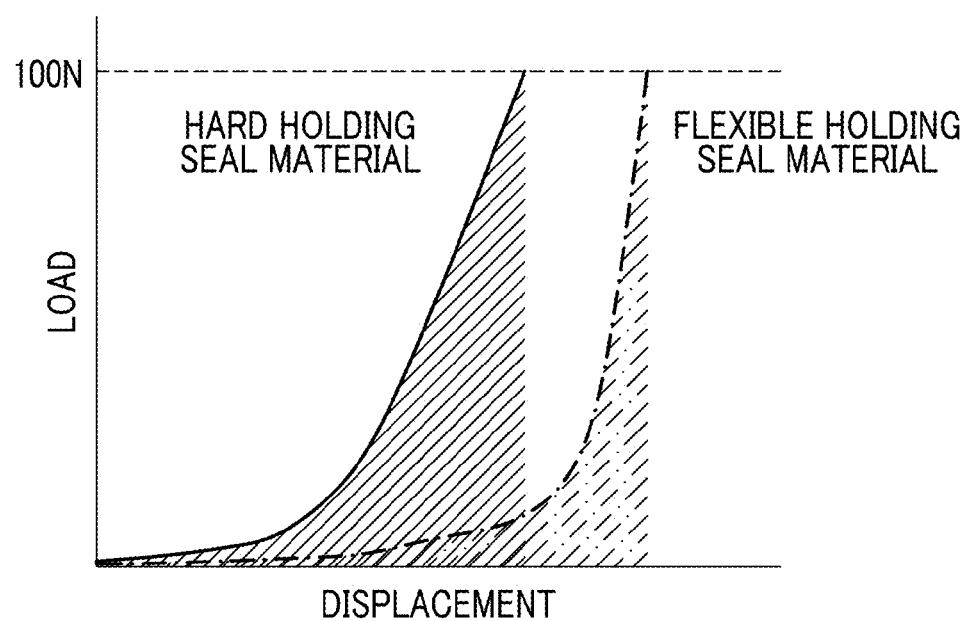
FIG. 10 is a graph schematically illustrating the relationship between load and displacement.

FIG. 10 is a graph schematically illustrating the relationship between the load and the displacement.

In FIG. 10, a graph of a hard and difficult-to-bend holding seal material is drawn on the left side, and a graph of a flexible and easy-to-bend holding seal material is drawn on the right side.

The graphs are drawn with the vertical axis representing the load applied to the lifting starting point and the transverse axis representing the displacement of the lifting starting point, and the measurement ends when the load reaches 100N.

In addition, the integral value of the relationship between the displacement and the load before the load reaches 100 N (the area of a portion indicated using hatching in FIG. 10) is obtained, and the moment (N·m) of the force is computed from the integral value.

The obtained moment of the force can be used as an index that evaluates the bendability of the holding seal material. The holding seal material is evaluated to be more flexible and easier to bend as the value of the moment of the force decreases.

The characteristics and evaluation results of the holding seal materials of the respective examples and the respective comparative examples were summarized in the table.

In the column of the "determination" in the table, the holding force when holding the exhaust gas treatment body and the windability when winding the holding seal material around the exhaust gas treatment body were evaluated using the evaluation results of the contact pressure, shear strength and bendability of the holding seal materials, were indicated using O in the case of pass, and were indicated using X in the case of fail.

TABLE 1

| | Attachment ratio of inorganic particles (weight %) | | | | Thickness of skin layer (nm) | | |
|---|---|---|---|---|---|---|---|
| | Total | First main surfaces α | Center β | Second main surfaces γ | First main surfaces X | Center Y | Second main surfaces Z |
| Example 1 | 0.5 | 0.9 | 0.6 | 0.2 | 91 | 55 | 37 |
| Example 2 | 1.0 | 1.7 | 0.9 | 0.5 | 121 | 74 | 51 |
| Example 3 | 3.0 | 3.9 | 1.4 | 0.9 | 475 | 143 | 74 |
| Comparative example 1 | 0.0 | 0.0 | 0.0 | 0.0 | 0 | 0 | 0 |
| Comparative example 2 | 1.1 | 1.0 | 0.9 | 1.0 | 76 | 55 | 71 |
| Comparative example 3 | 3.0 | 3.0 | 3.0 | 3.0 | 263 | 232 | 279 |

| | Contact pressure (kPa) | | | | Shear strength (kPa) | Bendability (N·mm) | Determination | |
|---|---|---|---|---|---|---|---|---|
| | Total | First main surfaces | Center | Second main surfaces | | | Holding force | Windability |
| Example 1 | 560 | 640 | 550 | 480 | 110 | 170 | O | O |
| Example 2 | 650 | 680 | 640 | 560 | 122 | 180 | O | O |
| Example 3 | 760 | 810 | 670 | 630 | 143 | 215 | O | O |
| Comparative example 1 | 450 | 450 | 440 | 450 | 95 | 155 | X | O |
| Comparative example 2 | 670 | 650 | 660 | 670 | 124 | 220 (*1) | O | X |
| Comparative example 3 | 780 | 760 | 750 | 770 | 147 | 270 (*2) | O | X |

(*1 In Comparative example 2, large wrinkles were generated in the holding seal material during the bendability evaluation.)
(*2 In Comparative example 3, cracking occurred in the holding seal material during the bendability evaluation.)

In the holding seal materials manufactured in Examples 1 to 3, the thicknesses X, Y and Z of the skin layers satisfied the relationship of X>Y>Z, and the attachment ratios α, β and γ of the inorganic particles satisfied the relationship of α>β>γ. As a result, the intensity of the contact pressure became largest in the vicinity of the first main surface, second largest in the vicinity of the center in the thickness direction, and third largest in the vicinity of the second main surface. In addition, the values of the shear strength and the bendability were preferable values, and the holding seal materials were excellent in terms of both the viewpoint of the holding force for the exhaust gas treatment body and the viewpoint of the windability.

In the holding seal material manufactured in Comparative example 1, the inorganic binder is not impregnated in the mat, and the inorganic particles are not attached to the inorganic fibers. Therefore, the contact pressure was low, the shear strength was insufficient, and the holding force for the exhaust gas treatment body was low.

In the holding seal materials manufactured in Comparative examples 2 and 3, the inorganic particles were substantially uniformly attached to the holding seal material in the thickness direction, and the thicknesses X, Y and Z of the skin layers does not satisfy the relationship of X>Y>Z.

Therefore, the holding seal material was hard, wrinkles or cracking occurred in the holding seal materials during the evaluation of the bendability, and the results were not preferable from the viewpoint of windability.

(Second Embodiment)

Hereinafter, a second embodiment, which is an embodiment of the holding seal material, the method of manufacturing a holding seal material and the exhaust gas purifying apparatus of the invention, will be described.

The holding seal material of the embodiment is almost the same as the first embodiment of the invention in terms of the configuration, but the difference is that the holding seal material of the embodiment further includes an organic binder.

As the organic binder, an emulsion obtained by dispersing an acryl-based latex, a rubber-based latex or the like in water can be used.

The method and order of attaching the organic binder to the inorganic fibers are not particularly limited, and examples thereof include a method in which, after the dewatering process in the method of manufacturing a holding seal material of the first embodiment of the invention, a liquid including the organic binder is sprayed and blown from the first main surface side and the second main surface side of the mat.

After that, a drying process for drying moisture included in the inorganic binder and the organic binder may be carried out.

The exhaust gas purifying apparatus of the embodiment is the same as the exhaust gas purifying apparatus of the first embodiment of the invention except that the holding seal material of the embodiment is used, and therefore will not be described in detail.

Hereinafter, the actions and effects of the holding seal material, the method of manufacturing a holding seal material, and the exhaust gas purifying apparatus according to the second embodiment of the invention will be listed.

In the embodiment, the effects (1) to (7) described in the first embodiment are exhibited, and the following effect is exhibited.

(8) The holding seal material of the embodiment further includes the organic binder.

When the organic binder is attached to the inorganic fibers, it is possible to make the interrelated structure of the inorganic fibers stronger, and to suppress an increase in the bulk of the holding seal material.

Hereinafter, examples, in which the second embodiment of the invention will be disclosed more specifically, will be described. Meanwhile, the invention is not limited to the examples.

EXAMPLE 4

(a) The mat preparation process, (b) impregnating process and (c) the dewatering process in Example 1 were carried out in the same manner as in Example 1.

Meanwhile, the concentration of the inorganic binder used in the impregnating process was set to be the same as in Example 2, and the attached amount of the inorganic particles was set to be the same as in Example 2.

Next, an organic binder-containing liquid having a concentration of the solid content of 1 weight % was manufactured by diluting a latex having acryl rubber dispersed in water (LX-811H manufactured by Zeon Corporation) using water, and the organic binder-containing liquid was sprayed on the top surface and bottom surface of the mat so that the attached amount of the organic binder per unit weight of the inorganic fibers became 1.0 g/100 g in terms of the solid content.

(d) The drying process and (e) the cutting treatment were carried out in the same manner as in Example 1 on the mat to which the inorganic binder and the organic binder had been attached, which had been obtained in the above manner, thereby completing the manufacturing of the holding seal material.

(Evaluation Results)

In the holding seal material manufactured in Example 4, the attachment ratios of the inorganic particles were 1.0 weight % in total, 1.6 weight % (α=1.6 weight %) in the vicinity of the first main surface, 1.0 weight % (β=1.0 weight %) in the vicinity of the center of the mat in the thickness direction, and 0.4 weight % (γ=0.4 weight %) in the vicinity of the second main surface. The thicknesses of the skin layers were 110 nm (X=110 nm) in the vicinity of the first main surface, 70 nm (Y=70 nm) in the vicinity of the center of the mat in the thickness direction, and 50 nm (Z=50 nm) in the vicinity of the second main surface.

The attachment ratio of the organic binder was 1 weight % in the entire mat.

Meanwhile, regarding the attachment ratio of the organic binder, the mat, to which the organic binder and the inorganic binder had been attached, was cut into a size of 100 mm×100 mm, the cut samples were heated in an oxidizing atmosphere at 700° C. so as to measure the weight reduction amount, and the attachment ratio was computed using the results.

The contact pressures were 620 kPa in total, 660 kPa in the vicinity of the first main surface, 630 kPa in the vicinity of the center of the mat in the thickness direction, and 550 kPa in the vicinity of the second main surface.

The shear strength was 117 kPa.

The bendability was 185 N·mm.

From the above results, it was found that the values of the shear strength and the bendability were both preferable values, and the holding seal material was excellent in terms of both the viewpoint of the holding force for the exhaust gas treatment body and the viewpoint of the windability.

(Third Embodiment)

Hereinafter, a third embodiment, which is an embodiment of the holding seal material, the method of manufacturing a holding seal material, and the exhaust gas purifying apparatus of the invention, will be described.

The difference is that the holding seal material of the embodiment includes a glass fiber and an alumina fiber as the inorganic fibers, and a larger number of the glass fibers are present in the vicinity of the first main surface than in the vicinity of the second main surface by weight ratio.

Figure 11:
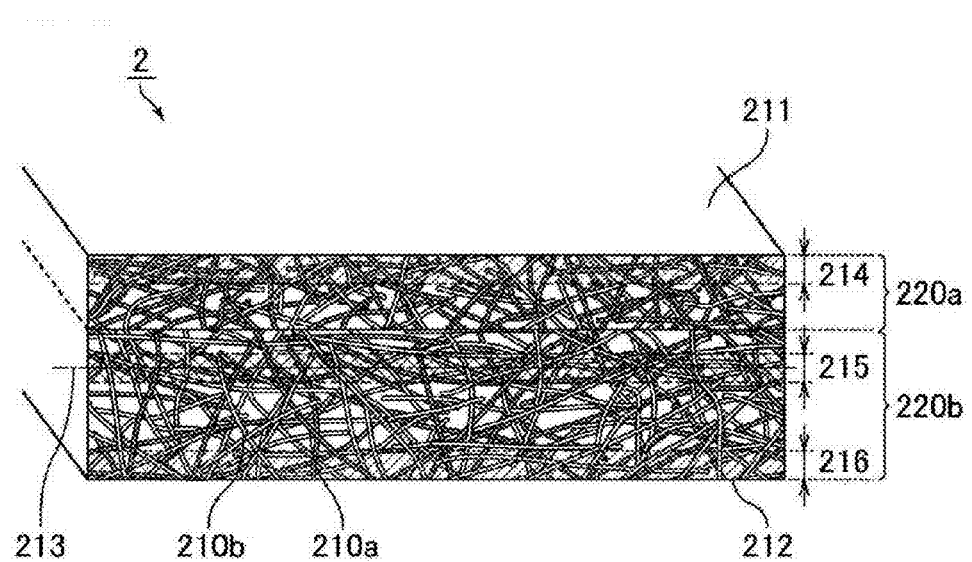
FIG. 11 is a perspective view of a partial cross-section schematically illustrating a cross-section of a holding seal material according to a third embodiment of the invention cut in the thickness direction.

FIG. 11 is a perspective view of a partial cross-section schematically illustrating a cross-section of a holding seal material according to the third embodiment of the invention cut in the thickness direction.

Similarly to the holding seal material 1 of the first embodiment of the invention, the holding seal material 2 of the embodiment has a planar plate shape that is substantially rectangular in a planar view, and has glass fibers 210*a* and alumina fibers 210*b* mixed therein.

In more detail, the holding seal material 2 is configured of a first mat 220*a*, in which a larger number of the glass fibers 210*a* are present than the alumina fibers 210*b* by weight ratio, and a second mat 220*b*, in which a larger number of the alumina fibers 210*b* are present than the glass fibers 210*a* by weight ratio.

The first mat 220*a* is present on the first main surface 211 side of the holding seal material, and the second mat 220*b* is present on the second main surface 212 side.

Therefore, in the vicinity of the first main surface 214 of the holding seal material, a larger number of the glass fibers are present by weight ratio compared to in the vicinity of the second main surface 216.

In addition, the second mat 220*b* is present in the vicinity of the center of the holding seal material in the thickness direction 215, and the composition of the inorganic fibers is the same as the composition of the inorganic fibers in the vicinity of the second main surface 216.

Meanwhile, a line 213 represents the center line of the holding seal material 2 in the thickness direction.

In the holding seal material 2 of the embodiment, the attached amount of the inorganic particles to the inorganic fibers is large in the first mat 220*a*, and the attached amount of the inorganic particles to the inorganic fibers is small in the second mat 220*b*.

In the first mat 220*a* and in the second mat 220*b*, the inorganic particles are uniformly attached to the inorganic fibers.

Therefore, the thickness X of the skin layer of the inorganic fibers in the vicinity of the first main surface, the thickness Y of the skin layer of the inorganic fibers in the vicinity of the center of the holding seal material in the thickness direction, and the thickness Z of the skin layer of the inorganic fibers in the vicinity of the second main surface satisfy the relationship of $X>Y=Z$.

In addition, the attachment ratio $\alpha$ of the inorganic particles in the vicinity of the first main surface, the attachment ratio $\beta$ of the inorganic particles in the vicinity of the center of the holding seal material in the thickness direction, and the attachment ratio $\gamma$ of the inorganic particles in the vicinity of the second main surface satisfy the relationship of $\alpha>\beta=\gamma$.

Hereinafter, an example of the method of manufacturing a holding seal material of the embodiment will be described.

The method of manufacturing a holding seal material of the embodiment includes a first mat preparation process of preparing a first mat which includes inorganic fibers and inorganic particles, and is formed by coating skin layers including the inorganic particles around the inorganic fibers, a second mat preparation process of preparing a second mat which includes inorganic fibers, and is formed by coating skin layers, which are thinner than the skin layers in the first mat, around the inorganic fibers or a second mat having no skin layer coated around the inorganic fiber, and a process of laminating the first mat and the second mat.

(1) First Mat Preparation Process (1-1) Liquid Mixture Preparation Process

Alumina fibers, silica fibers, an organic binder, an inorganic binder including inorganic particles and water, and water are mixed so that the content of the inorganic fibers (the alumina fibers and the silica fibers) in the raw material liquid becomes a predetermined value, and stirred using a stirrer, thereby preparing a liquid mixture.

(1-2) Papermaking Process

Next, after the liquid mixture is made to flow into a molding tank having filtration meshes formed on the bottom surface, water in the liquid mixture is dewatered through the meshes, thereby manufacturing a first mat precursor.

(1-3) Heating and Compression Process

The first mat precursor is heated and compressed under predetermined conditions so as to manufacture a mat having a predetermined gap bulk density. When the precursor undergoes this process, the alumina fibers and the silica fibers are firmly fixed to each other through the organic binder and the inorganic binder so that the shape of the first mat is held.

The inorganic fibers included in the first mat manufactured in the above manner are coated with skin layers including inorganic particles derived from the inorganic binder.

(2) Second Mat Preparation Process (2-1) Liquid Mixture Preparation Process

In the liquid mixture preparation process, the alumina fibers and the silica fibers are blended so that the number of the alumina fibers becomes large and the number of the silica fibers becomes small compared to the first mat preparation process. In addition, the blended amount of the inorganic binder is made to be smaller than the blended amount of the inorganic binder in the first mat preparation process, or the inorganic binder is not blended. Except the above, the liquid mixture is prepared in the same manner as in the liquid mixture preparation process (1-1) of the first mat preparation process. Hereinafter, the papermaking process and the heating and compression process are carried out in the same manner as in the first mat preparation process, thereby manufacturing a mat having a predetermined gap bulk density.

The second mat manufactured in the above manner includes a relatively larger number of the alumina fibers, and the inorganic fibers included in the second mat are thinly coated with skin layers including the inorganic particles derived from the inorganic binder, or are not coated.

(3) Laminating Process

The first mat and the second mat are laminated and integrated, thereby manufacturing a laminate.

The laminating method is not particularly limited, and examples thereof include joining using thread sewing or adhesive tape, adhesion using an adhesive, and the like.

(4) Cutting Process

The laminate is cut so as to manufacture a holding seal material having a predetermined size. At this time, the laminate is cut so that, of the end surfaces of the holding seal material, a protrusion portion is formed on a part of an end surface, and a recess portion having a shape that engages with the protrusion portion is formed on the other end surface.

In the holding seal material manufactured in the above manner, the first mat forms the first main surface side, and the second mat forms the second main surface side. In addition, the attached amount of the inorganic particles to the inorganic fibers is large in the first mat, and the attached amount of the inorganic particles to the inorganic fibers is small in the second mat, or the inorganic particles are not attached.

The exhaust gas purifying apparatus of the embodiment is the same as the exhaust gas purifying apparatus of the first embodiment of the invention except that the holding seal material of the embodiment is used, and therefore will not be described in detail.

Hereinafter, the actions and effects of the holding seal material, the method of manufacturing a holding seal material, and the exhaust gas purifying apparatus according to the third embodiment of the invention will be listed.

In the embodiment, the effects (1) to (5), (7) and (8) described in the first and second embodiments are exhibited, and the following effects are exhibited.

(9) In the holding seal material of the embodiment, the glass fiber and the alumina fiber are included as the inorganic fibers, and a larger number of the glass fibers are present in the vicinity of the first main surface compared to in the vicinity of the second main surface by weight ratio.

When the holding seal material having the above configuration is wound around the exhaust gas treatment body with the first main surface disposed on the casing side and the second main surface disposed on the exhaust gas treatment body side, and is accommodated in the casing, thereby producing an exhaust gas purifying apparatus, the exhaust gas purifying apparatus has a high holding force on the casing side, is excellently heat-resistant and easy to bend on the exhaust gas treatment body side.

(10) The method of manufacturing a holding seal material of the embodiment includes the first mat preparation process of preparing the first mat which includes the inorganic fibers and the inorganic particles, and is formed by coating skin layers including the inorganic particles around the inorganic fibers, the second mat preparation process of preparing the second mat which includes inorganic fibers, and is formed by coating skin layers, which are thinner than the skin layers in the first mat, around the inorganic fibers or the second mat having no skin layer coated around the inorganic fibers, and the process of laminating the first mat and the second mat.

When a plurality of mats with the skin layers of the inorganic fibers having different thicknesses are laminated, it is possible to manufacture a holding seal material in which the thicknesses of the skin layers of the inorganic fibers in the vicinity of the first main surface are thick, and the thicknesses of the skin layers of the inorganic fibers in the vicinity of the second main surface are thin.

(Other Embodiments)

The thicknesses of the skin layers in the holding seal materials of the first and second embodiments of the invention are X>Y>Z, but a holding seal material, in which the thicknesses of the skin layers are X>Y=Z, is also included in the holding seal material of the embodiment of the invention.

In addition, a holding seal material, in which the attachment ratios of the inorganic particles in the holding seal materials of the first and second embodiments of the invention are $\alpha>\beta=\gamma$ is also included in the holding seal material of the embodiment of the invention.

Examples of a method in which the thicknesses of the skin layers and the attachment ratios of the inorganic particles are made to satisfy the above relationships include the following method.

A plurality of mats for a holding seal material made of inorganic fibers, on which the needle punching treatment has been carried out, which has been described in the method of manufacturing a holding seal material of the first embodiment of the invention, is prepared.

Next, the concentration of the inorganic particles in the inorganic binder is adjusted, and the inorganic binder is impregnated in the mats, thereby producing mats having different thicknesses of the skin layers of the inorganic fibers and different attachment ratios of the inorganic particles. For example, one mat has a large thickness of the skin layer and a large attachment ratio of the inorganic particles, and two mats have a small thickness of the skin layer and a small attachment ratio of the inorganic particles. In addition, lamination is carried out so that the mat having a large thickness of the skin layer and a large attachment ratio of the inorganic particles is located on the first main surface side, and the two remaining mats are located in the vicinity of the center of the holding seal material in the thickness direction and in the vicinity of the second main surface, whereby it is possible to manufacture a holding seal material in which the thicknesses of the skin layers satisfy the above relationships.

In addition, a holding seal material in which the thickness Z of the skin layer is zero, and a holding seal material in which the attachment ratio $\gamma$ is zero are also included in the holding seal material of the embodiment of the invention.

In order to manufacture the above holding seal materials, lamination may be carried out so that a mat to which the inorganic particles are not attached is located in the vicinity of the second main surface.

In the holding seal material of the third embodiment of the invention, a case in which only one kind of inorganic fiber is included is also included in the holding seal material of the embodiment of the invention.

In addition, a holding seal material in which the thicknesses of the skin layers in the holding seal material of the third embodiment of the invention are X>Y>Z and a holding seal material in which the attachment ratios of the inorganic particles are $\alpha>\beta>\gamma$ are also included in the holding seal material of the embodiment of the invention.

Examples of a method of manufacturing the above holding seal materials include the following method.

First, the inorganic binder is impregnated in the second mat so as to manufacture the second mat in which the thickness of the skin layers and the attachment ratios of the inorganic particles in the second mat are changed in the thickness direction by changing the conditions of heating and hot air drying as described in the method of manufacturing a holding seal material of the first embodiment of the invention. Next, the second mat is laminated so that the surface having a large thickness of the skin layer and a large attachment ratio of the inorganic particles comes into contact with the first mat.

Alternatively, a method, in which three or more mats having different thicknesses of the skin layers and different attachment ratios of the inorganic particles are prepared, a mat having a large thickness of the skin layer is disposed in the vicinity of the first main surface, a mat having an intermediate thickness of the skin layer is disposed in the vicinity of the center of the holding seal material in the thickness direction, and a mat having a small thickness of the skin layer in the vicinity of the second main surface is disposed, and the mats are laminated, may be used.

The shape of the secondary particles of the inorganic particles in the inorganic binder may be a fiber shape, a rod shape, a beads shape, a feather shape or a lump shape in addition to the above chain shape.

The alumina fiber may include additives, for example, CaO, MgO and $ZrO_2$, in addition to alumina.

The composition ratio of the alumina silica fiber is desirably, by weight ratio, $Al_2O_3:SiO_2=60:40$ to 80:20, and more desirably $Al_2O_3:SiO_2=70:30$ to 74:26.

The silica fiber may include additives, for example, CaO, MgO and $ZrO_2$, in addition to silica.

A bio-soluble fiber refers to an inorganic fiber including at least a compound selected from a group consisting of, for example, alkali metal compounds, alkaline-earth metal compounds and boron compounds in addition to silica and the like.

The bio-soluble fiber made of the above compounds easily dissolves even when injected into a human body, and therefore a mat including the above inorganic fiber is excellent in terms of safety with respect to human bodies.

Specific examples of the composition of the bio-soluble fiber include a composition including 60 weight % to 85 weight % of silica and 15 weight % to 40 weight % of at least a compound selected from a group consisting of alkali metal compounds, alkaline-earth metal compounds and boron compounds. The above silica refers to SiO or $SiO_2$.

Examples of the alkali metal compound include oxides of Na and K, and the like, and examples of the alkaline-earth metal compound include oxides of Mg, Ca and Ba. Examples of the boron compound include oxides of B.

Regarding the composition of the bio-soluble fiber, when the content of silica is less than 60 weight %, it is difficult to manufacture the bio-soluble fiber using a glass fusion method, and fibrillation is difficult.

In addition, when the content of silica is less than 60 weight %, since the content of flexible silica is small, the bio-soluble fibers are structurally brittle, easily dissolve in a normal saline solution, and have a relatively large fraction of at least a compound selected from a group consisting of alkali metal compounds, alkaline-earth metal compounds and boron compounds such that there is a tendency for the bio-soluble fibers to become excessively readily soluble in a normal saline solution.

On the other hand, when the content of silica exceeds 85 weight %, since the fraction of at least a compound selected from a group consisting of alkali metal compounds, alkaline-earth metal compounds and boron compounds becomes relatively large, there is a tendency for the bio-soluble fibers to become excessively non-readily soluble in a normal saline solution.

Meanwhile, the content of silica is obtained by computing the amount of SiO and $SiO_2$ in terms of $SiO_2$.

In addition, in the composition of the bio-soluble fiber, the content of at least a compound selected from a group consisting of alkali metal compounds, alkaline-earth metal compounds and boron compounds is desirably 15 weight % to 40 weight %. When the content of at least a compound selected from a group consisting of alkali metal compounds, alkaline-earth metal compounds and boron compounds is less than 15 weight %, the bio-soluble fibers become non-readily soluble in a normal saline solution.

Meanwhile, when the content of at least a compound selected from a group consisting of alkali metal compounds, alkaline-earth metal compounds and boron compounds exceeds 40 weight %, it is difficult to manufacture the bio-soluble fiber using a glass fusion method, and fibrillation is difficult. In addition, when the content of at least a compound selected from a group consisting of alkali metal compounds, alkaline-earth metal compounds and boron compounds exceeds 40 weight %, the bio-soluble fibers are structurally brittle, and become excessively readily soluble in a normal saline solution.

The solubility of the bio-soluble fiber in a normal saline solution is desirably 30 ppm or more. This is because, when the solubility of the bio-soluble fiber is less than 30 ppm, in a case in which the inorganic fibers are injected into a human body, it is difficult to discharge the inorganic fibers outside the human body, and the solubility of less than 30 ppm is not preferable in terms of human health.

The glass fiber refers to a glassy fiber including silica and alumina as the main components, and including calcia, titania, zinc oxide and the like except alkali metals.

The fiber density (weight per unit area) of the mat according to the embodiment of the invention is not particularly limited, but is desirably 200 $g/m^2$ to 4000 $g/m^2$, and more desirably 1000 $g/m^2$ to 3000 $g/m^2$. When the fiber density of the mat is less than 200 $g/m^2$, the holding force as a holding seal material is not sufficient, and, when the fiber density of the mat exceeds 4000 $g/m^2$, it is difficult to decrease the bulk of the mat. Therefore, in a case in which an exhaust gas purifying apparatus is manufactured using the mat as a holding seal material, the exhaust gas treatment body becomes liable to be detached from the casing.

In addition, the gap bulk density (the gap bulk density of the holding seal material before canning) of the mat is also not particularly limited, but is desirably 0.10 $g/cm^3$ to 0.50 $g/cm^3$. When the gap bulk density of the mat is less than 0.10 $g/cm^3$, since the entanglement of the inorganic fibers is weak, and the inorganic fibers are liable to be separated, it becomes difficult to hold the shape of the mat in a predetermined shape.

In addition, when the gap bulk density of the mat exceeds 0.50 $g/cm^3$, the mat becomes hard, the windability of the exhaust gas treatment body degrades, and the mat becomes liable to be cracked.

The thickness of the mat according to the embodiment of the invention is not particularly limited, but is desirably 3.0 mm to 50 mm, and more desirably 6.0 mm to 20 mm.

When the thickness of the mat is less than 3.0 mm, the holding force as a holding seal material is not sufficient. Therefore, in a case in which an exhaust gas purifying apparatus is manufactured using the mat as a holding seal material, the exhaust gas treatment body becomes liable to be detached from the casing. In addition, when the thickness of the mat exceeds 50 mm, since the mat is too thick, the windability of the exhaust gas treatment body degrades, and the mat becomes liable to be cracked.

In a case in which the organic binder is used, the kind thereof is not particularly limited, and examples thereof include epoxy resins, acryl resins, rubber-based resins, styrene-based resins and the like.

Among the above organic binders, rubber-based resins (latexes) and the like are preferable. Examples of the organic binder-containing liquid containing the organic binder include solutions in which a water-soluble organic polymer, such as carboxymethyl cellulose or polyvinyl alcohol, is dissolved, latexes in which acryl rubber, acrylonitrile-butadiene rubber or styrene-butadiene rubber is dispersed in water, and the like.

The holding seal material of the embodiment of the invention has essential components of including the inorganic fibers and the inorganic particles, having the first main surface and the second main surface, the inorganic fibers being coated with the skin layers including the inorganic particles, and having the thicknesses of the skin layers satisfying the following relational expression (1).

When the thickness of the skin layer of the inorganic fibers in the vicinity of the first main surface is X, the thickness of the skin layer of the inorganic fibers in the vicinity of the center of the holding seal material in the thickness direction is Y, and the thickness of the skin layer of the inorganic fibers in the vicinity of the second main surface is Z, $$X > Y \geq Z \qquad (1).$$

Desired effects can be obtained by appropriately combining a variety of the configurations described in the first to third embodiments of the invention and the other embodiment of the invention (for example, the distribution of the thicknesses of the skin layers, the kind of the inorganic fibers, the presence of the organic binder, the method of manufacturing the mat, and the like) with the above essential components.

Obviously, numerous modifications and variations of the present invention are possible in light of the above teachings. It is therefore to be understood that within the scope of the appended claims, the invention may be practiced otherwise than as specifically described herein.

The invention claimed is:

1. A holding seal material comprising:
    inorganic fibers;
    skin layers provided around the inorganic fibers;
    inorganic particles included in the skin layers;
    a first main surface; and
    a second main surface,
    wherein thicknesses of the skin layers satisfy a following relational expression (1), $$X > Y \geq Z \qquad (1)$$

wherein X is a thickness of the skin layer of the inorganic fibers in a vicinity of the first main surface,
    Y is a thickness of the skin layer of the inorganic fibers in a vicinity of a center of the holding seal material in a thickness direction, and
    Z is a thickness of the skin layer of the inorganic fibers in a vicinity of the second main surface.

2. The holding seal material according to claim 1, wherein the inorganic fibers include glass fibers and alumina fibers, and
    a more amount of the glass fibers are present in the vicinity of the first main surface than in the vicinity of the second main surface by weight.

3. The holding seal material according to claim 1, further comprising:
    an organic binder.

4. The holding seal material according to claim 1, which is obtained from a mat made of inorganic fibers on which a needle punching treatment has been carried out.

5. An exhaust gas purifying apparatus comprising:
    an exhaust gas treatment body;
    a metal casing that accommodates the exhaust gas treatment body; and
    the holding seal material according to claim 1, being disposed between the exhaust gas treatment body and the metal casing, and holding the exhaust gas treatment body.

* * * * *